SYNCHRONIZATION CIRCUITS IN A PCM CENTRAL EXCHANGE

Filed March 8, 1967 15 Sheets-Sheet 1

Aug. 18, 1970 M. J. HERRY ET AL 3,524,937

SYNCHRONIZATION CIRCUITS IN A PCM CENTRAL EXCHANGE

Filed March 8, 1967 15 Sheets-Sheet 10

Aug. 18, 1970 M. J. HERRY ET AL 3,524,937

SYNCHRONIZATION CIRCUITS IN A PCM CENTRAL EXCHANGE

Filed March 8, 1967 15 Sheets-Sheet 11

United States Patent Office 3,524,937
Patented Aug. 18, 1970

3,524,937
SYNCHRONIZATION CIRCUITS IN A PCM CENTRAL EXCHANGE

Michel Jean Herry, Aulnay-sous-Bois, and Jean Leon Roger Jamet, Paris, France, assignors to International Standard Electric Corporation, New York, N.Y., a corporation of Delaware Filed Mar. 8, 1967, Ser. No. 621,691
Claims priority, application France, Mar. 9, 1966, 52,687
Int. Cl. H04j 3/06
U.S. Cl. 179—15 8 Claims

ABSTRACT OF THE DISCLOSURE

A circuit for restoring synchronism to a PCM telecommunication system performs, in sequence: (1) a frame code check to find desynchronism, (2) a frame search to identify the source of trouble, and (3) a frame correction for modifying the storage of data to cause a lead or lag correction for restoring synchronism. This allows (1) binary word messages to be transmitted in parallel through the switching stages, (2) synchronism of pulse and frame independently of each other, and (3) normal operation under conditions of ambiguous synchronism test results.

The present invention concerns synchronization circuits associated with each central exchange of a data transmission network operating in time multiplex and in pulse code modulation or "PCM." More precisely, if a *multiplex trunk* designates a transmission channel provided for treating *m* messages in time multiplex, and if *n* trunks terminate at the central exchange, the invention concerns a system for carrying out the synchronization of the pulses and of the messages received over the *n* trunks.

These synchronization circuits will be described, by way of example, in their application to a PCM system presenting the following characteristics:

frame period: $T_R=125$ μs.;
number of channels per trunk: $m=24$. The twenty-three first channels are reserved for the transmission of the codes or messages concerning communications, and the twenty-fourth to the transmission of a particular code called synchronization or framing code;
number of binary digits constituting the message transmitted over one channel $p=6$;
one pulse or *message signal* is transmitted when the corresponding digit is 1.

Each central exchange of a network comprises its own local clock which supplies the following signals:

channel time slot signals referenced *t*1 to *t*24 which divide each frame period into twenty-four channel time slots of equal duration. Each one of these signals has a duration $t_P=5{,}208$ μs.;
*digit time slot* signals referenced *m*1 to *m*6 which divide each channel time slot into six digit time slots of equal duration. Each one of the digit time slots thus defined is used in particular for the transmission in series form, from the central exchange of one of the digits of a message;
*basic time slot signals* referenced *a, b, c, d* which divide each digit time slot into four basic time slots of equal duration.

The whole of these signals define the *central exchange time* HC.

The transmission of the messages between two central exchanges A and B is carried out over one trunk which comprises two lines reserved respectively, to the transmission from A towards B and to the transmission from B towards A.

For the requirements of the transmission and of the switching, each of the trunks which terminate at a given central exchange is identified by a particular code called trunk code. On each trunk each one of the *m* channels is identified by the channel time slot code at which it is received, the homologous channels of the two lines which constitute a trunk being identified by the same code.

When message signals are transmitted from the central exchange B towards the central exchange A, they are phased, in the transmitter central exchange B, on the time scale (digit time slot signals) set up by the local clock of this central exchange. If one considers, by way of example, that the transmission comprises an uninterrupted series of digits 1, or message signals, this means that a signal is transmitted at each digit time slot defined by the clock of the central exchange B.

But, it is known that in a transmission, the time positions of the message signals are submitted to certain perturbations which may be classified as *frequency drift, phase jitter* and *desynchronization.*

(A) *The frequency drift.*—it is a slow variation of the frame period of the signals which may be considered as a phase displacement of the signals received in the central exchange A with respect to the signals delivered by the local clock of this central exchange. It is due to modifications of the propagation conditions in the transmission medium used (telephone line, radio link, etc.) and to the relative drift between the clocks of the central exchanges B and A. It will be noted that the beat period between the signals received and the clock signals of the central exchange A is very high ($10^4$ to $10^5$ seconds) so that the phase displacement may keep the same sign during very long periods. As a result, if a unit time interval T*u* is considered, the number of message signals received during this time T*u* is never, in practice, equal to the number of digit time slot signals delivered during the same time by the clock of the central exchange A.

But the switching stage of the central exchange A must set up, for each communication between subscribers, a connection between two channels which may belong to different trunks affected by fluctuations which present no correlation at all between them. It is thus necessary, in order to set up such connection, to use a common time base which is the central exchange time HC.

Thus, if it is assumed that, for a given trunk, the digit time slot *m*5 of the channel time slot *t*21 (time *t*21.*m*5) is reserved for the processing of the fifth message signal belonging to the channel 21, it results from the drift that the time position of this signal varies slowly and that it coincides successively, for a given direction of the phase displacement, with the time signals *t*21.6, *t*22.1, *t*22.2, etc. It is thus seen that a signal of the channel 3 may be received during the time reserved for the processing of the channel 4, then of the channel 5, etc. and that the messages are completely disturbed.

(B) *The phase jitter.*—it is a quick fluctuation of the message signals on both sides of the average position at which they should be located if they were not affected by the drift. It is due to various causes such as crosstalk between lines, the induction effect of parasitic periodical signals, the interactions between the signals transmitted successively when the transmission medium introduces amplitude and phase distortions, etc.

The phase jitter is troublesome for transmission and for switching and its amplitude increases in relation to the length of the transmission line, so that it may reach one or several digit time slots and may cause disturbances to the messages.

(C) *The desynchronization.*—it occurs when the drift can not be compensated or when the framing is lost either because of an important disturbance in the transmission, or of the starting of the exchange. The messages are then received at times which no longer have any relation with the times reserved for the processing of these messages. The operation of the central exchange is completely disturbed.

Before describing briefly the systems used for suppressing the effects of these perturbations, it will be noted that in the system according to the invention, one has placed, on each incoming line, a buffer memory or *data store* in which the messages are written in succession when they are received and are read therefrom in an asynchronous way in order to be transmitted through the switch. This data store comprises *m* lines and *p* columns, each one of the lines being the address for one message. At each frame period, the information related, for instance, to the channel 13, is thus written on the line 13 of the memory and is available therein in parallel form. The address selection signals in this memory will be referenced V1 to V24, the signal V24 being that reserved for the selection of the address identifying the framing code.

The mode of operation of these memories has been described in detail in the U.S. Pat. 3,274,339 assigned to the assignee of this invention.

As a general rule, the phase jitter is eliminated by writing the message signals, the duration of which is short with respect to that of a digit time slot (1 or 0.5 basic time slot for instance), in a second buffer memory or phase corrector which precedes the data store, the selection signals of this memory having a duration of one digit time slot and are obtained from the signals received over the trunk. One may thus admit a total jitter amplitude A*v* of about one digit time slot.

These signals are read under the control of the time signals HC so that they are free of all jitter.

In order to compensate the effects of the *drift,* an error signal is elaborated by comparing the average frequency of the signals received with that of the clock signals. Since the difference between these two frequencies is very low, this operation is a phase detection which is generally carried out in a digital type detector which supplies information of a discontinuous nature over the amplitude and the sign of the phase shift. This error signal is used afterwards for modifying the times of writing and/or of reading of the buffer memories in such a way as the messages received are written at the exact addresses assigned to them in the data store.

It is known that the period of the signals supplied by a phase detector is equal to the beat period $T_B$ between the compared signals, this period $T_B$ being the time interval during which the number of signals in the two trains differ exactly by one unit. It is thus realized that, in spite of the corrections just mentioned, signals may be lost during the writing in the data store. Nevertheless, if these corrections are carried out at the time of the writing of the framing code in the data store, no message at all is lost.

A trunk is said to be synchronized when the framing code is received at the time where the address 24 reserved to this channel is selected for writing in the data store. If the time positions of this code and of the selection signal V24 are compared, an error signal is obtained which characterizes the desynchronization when said time positions do not coincide. The detection of such an error signals controls the starting of the channel framing operations which are:

(a) A first check of the codes received at time V24 during three frame periods;

(b) A framing code search if three non-coincidences have occurred;

(c) An error correction by modifying the advance of the selectors of the phase corrector and/or of the data store;

(d) A second check.

The object of the present invention is thus to control the writing of each message transmitted over a time multiplex trunk in the particular address assigned to it in a data store by suppressing the effects of the frequency drift of the phase jitter and of the perturbations in the transmission.

Before describing the invention, one will briefly discuss the logical algebra notations which will be used herein in order to simplify the writing in the description of the logical operations. The subject is treated extensively in numerous papers and in particular in the book "Logical design of digital computers" by M. Phister (J. Wiley—publisher).

Thus, if a condition characterized by the presence of a signal is written A, the condition characterized by the absence of said signal will be written $\overline{A}$.

These two conditions are linked by the well known logical relation $Ax\overline{A}=0$, in which the sign "*x*" is the symbol of the coincidence logical function or "AND" function.

If a condition C appears only if the conditions A and B are simultaneously present, one writes $A\ x\ B=C$ and this function may be carried out by means of a coincidence or AND circuit.

If a condition C appears when at least one of two conditions E and F is present, one writes $E+F=C$ and this function is carried out by means of a mixing gate or OR circuit.

Since these AND and OR logical functions are commutative, associative and distributive, one may write:

$A+B=B+A$;

$A\ x\ (B+C)=A\ x\ B+A\ x\ C$;

$(A+B)(C+D)=A\ x\ C+A\ x\ D+B\ x\ C+B\ x\ D$; etc.

Last, a function of two variables A and B may present four possible combinations and, if one writes A *x* B, the three other combinations are globally represented by the expression $\overline{AxB}$.

If one characterizes the condition A by the digit 1 and the condition $\overline{A}$ by the digit 0, the condition B by the digit 1 and the condition B by the digit 0, the combination $AxB$ may be written 11, the combination $\overline{A}xB$ may be written 01, etc.

One will also specify, in relation with the FIG. 1, the meaning of some particular symbols used in the drawings which come with the description of the invention. Thus:

FIG. 1(*a*) represents a simple AND circuit;

FIG. 1(*b*) represents a simple OR circuit;

FIG. 1(*c*) represents a multiple AND circuit, which comprises, in the case of the example, four AND circuits, having each a first input terminal connected to each one of the conductors 91*a* and a second input terminal connected to a common conductor 91*b*;

FIG. 1(*d*) represents a multiple OR circuit which comprises, in the case of the example, four OR circuits having each two input terminals 91*c* and 91*d*, and which delivers, over the four output conductors 91*e*, the same signals as those applied over either of said input terminals;

FIG. 1(*e*) represents an AND circuit having two input terminals 91*f*, 91*g* and which is blocked when a signal is applied over the input 91*f*;

FIG. 1(*h*) represents a bistable circuit or "flip-flop" to which a control signal is applied over one of its input terminals 92–1 or 92–0 in order to set it in the 1 state or to reset it in the 0 state. A voltage of same polarity as that of the control signals is present, either on the output 93–1 when the flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{\mathbf{B1}}$;

FIG. 1(*i*) represents a group of several conductors, five in the considered example;

FIG. 1(*j*) represents a multiplexing of conductors so that, in the shown example, ten output conductors **94*j* are connected in parallel to the same input conductor 94*h***;

FIG. 1(*k*) represents a flip-flop register. In the case of the figure, it comprises four flip-flops having its 1 input terminals connected to the conductors of the group **92*a* and its 1 output terminals connected to the conductors of the group 93*a*. The digit "0," placed at one end of the register, means that this latter is cleared when a signal is applied on the conductor 91*h***;

FIG. 1(*l*) represents a decoder which, in the case of the example, transforms a four-digit binary code group applied over the group of conductors **94*a* into a one out of sixteen codes, so that a signal appears on only one among the sixteen conductors 94*b*** for each one of the code groups applied at the input;

FIG. 1(*m*) represents a decoder which is so designed that it delivers an output signal only when the binary code group corresponding to the decimal number 5 is applied over its input terminals:

FIG. 1(*p*) represents a code comparator which delivers a signal over its output terminal **95*a* when the three-digit code groups applied over its terminals 95*b* and 95*c*** are not identical;

FIG. 1(*q*) represents the detailed diagram of said comparator to which the code groups are delivered by the registers **90*g*, 90*h* and which comprises the AND circuits 97*a* to 97*f* as well as the OR circuit 97*g*. The two AND circuits associated to each pair of flip-flops having the same rank in the registers constitute, in association with the OR circuit, an "Exclusive OR" circuit so that a signal appears over the output terminal 95*a*** when the compared code groups differ by at least one digit;

FIG. 1(*w*) represents a flip-flop counter which counts the pulses applied to its input terminal **94*c* and which is cleared by the application of a signal on its input 94*d*. The 1 outputs of the flip-flops are connected to the output conductors 94*e***.

In the course of the description one will frequently use the reference of a signal preceded by the letter "C" for referencing the binary code which, when decoded, gives said signal. Thus "CV1" designates the code to which corresponds the signal "V1."

At last, one will note that, in the different figures associated with the description, the electronic gates (AND, OR circuits) are not referenced. In fact, every gate is unambiguously identified, in the text, by the logical equation describing the function it performs and by the figure number, the reference of each applied elementary signal being set near the corresponding input terminal. Thus, the AND circuit of FIG. 1(*a*) would be defined as the logical circuit delivering a signal W*v* for the logical condition: W*t* x W*u*, FIG. 1(*a*).

The present invention will be particularly described with reference to the accompanying drawings in which.

Figure 3:
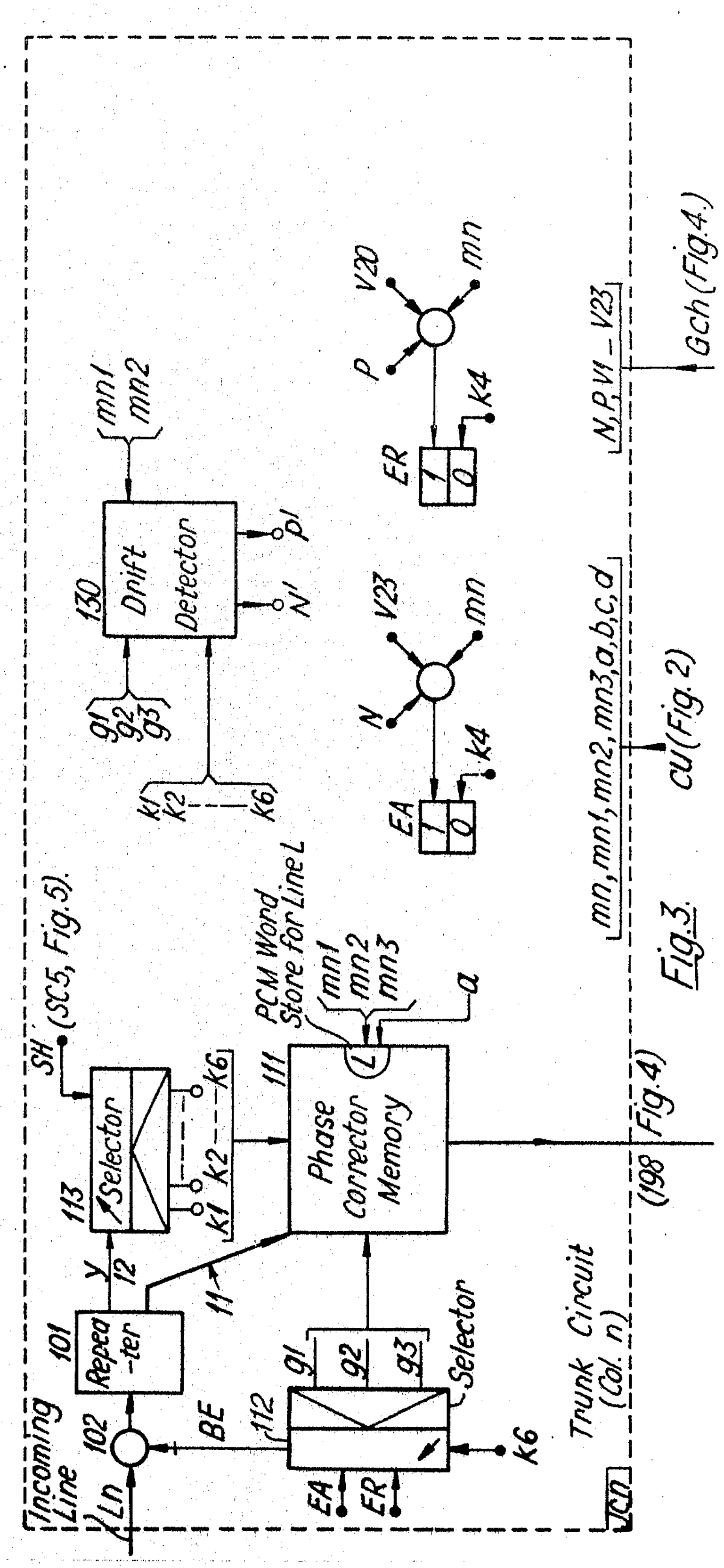
FIG. 3 represents the detailed diagram of a trunk circuit.
Figure 4:
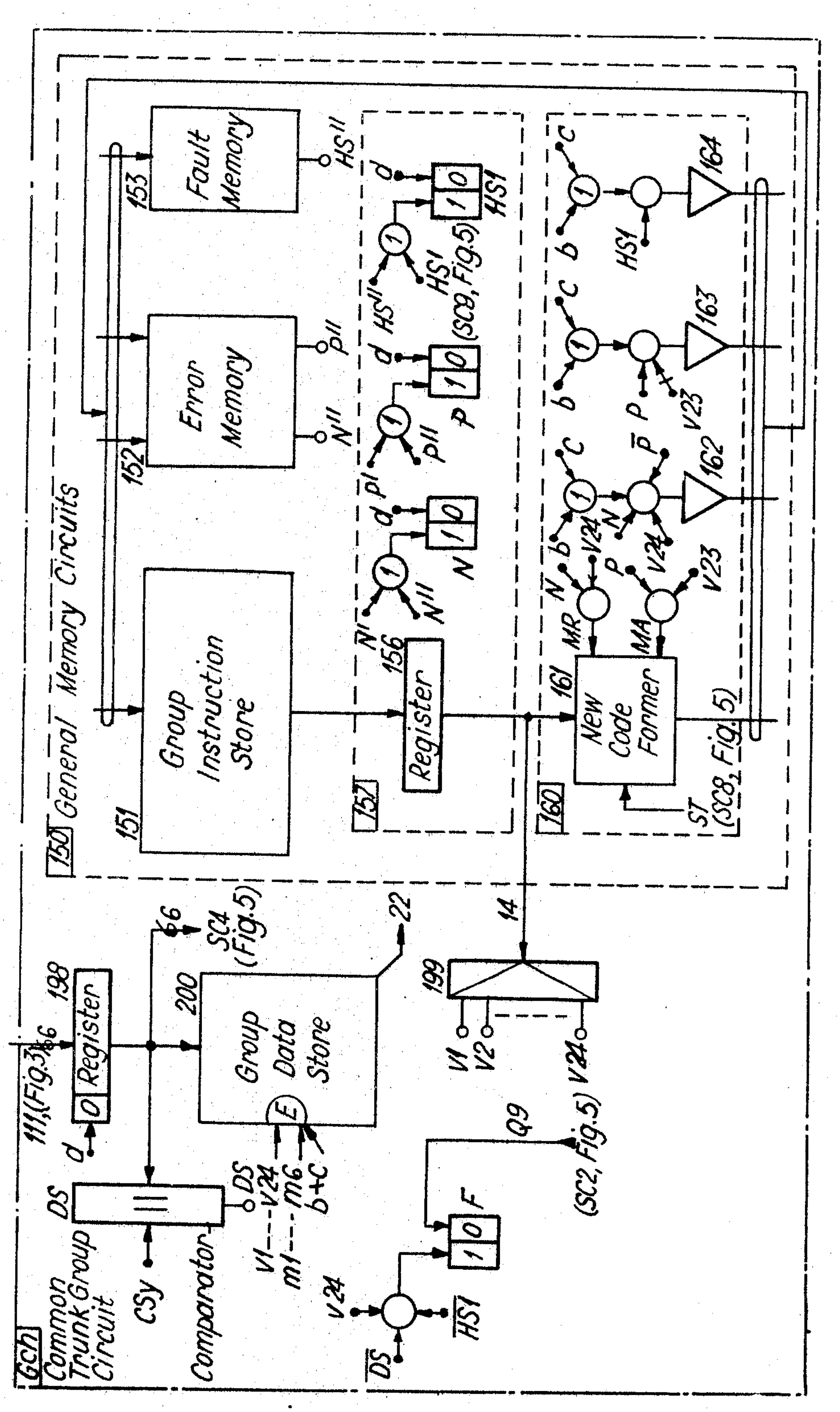
FIG. 4 represents the detailed diagram of a trunk group circuit.
Figure 7B:
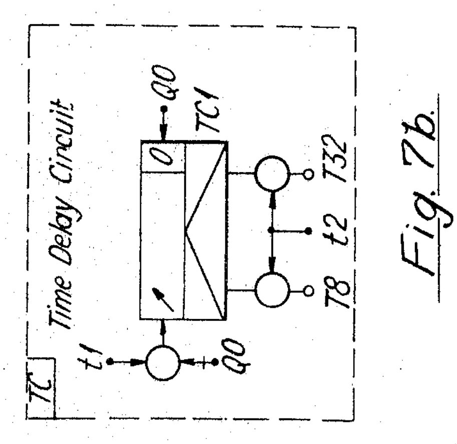
Figure 7A:
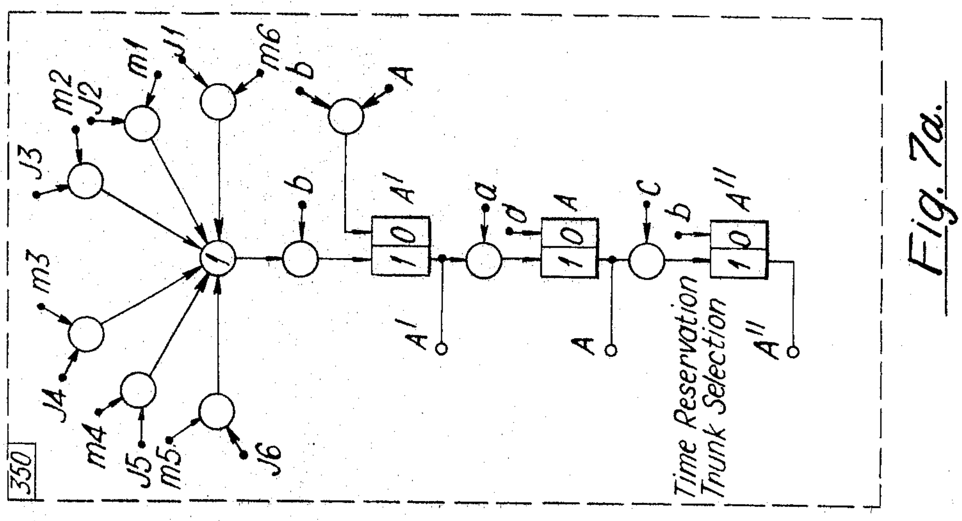
Figure 7:
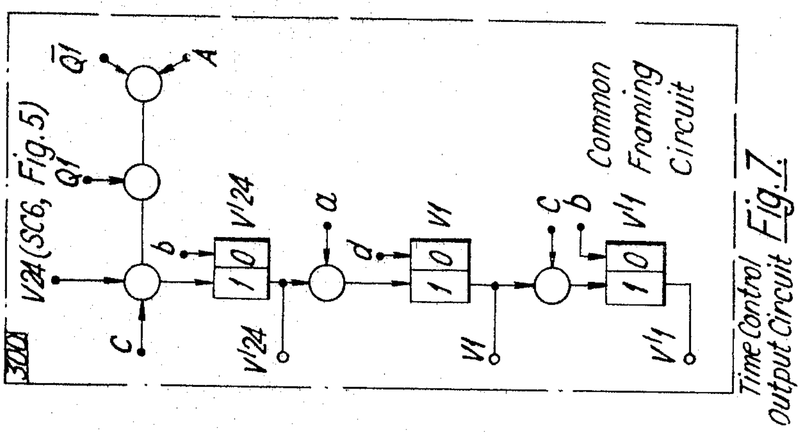
Figure 8:
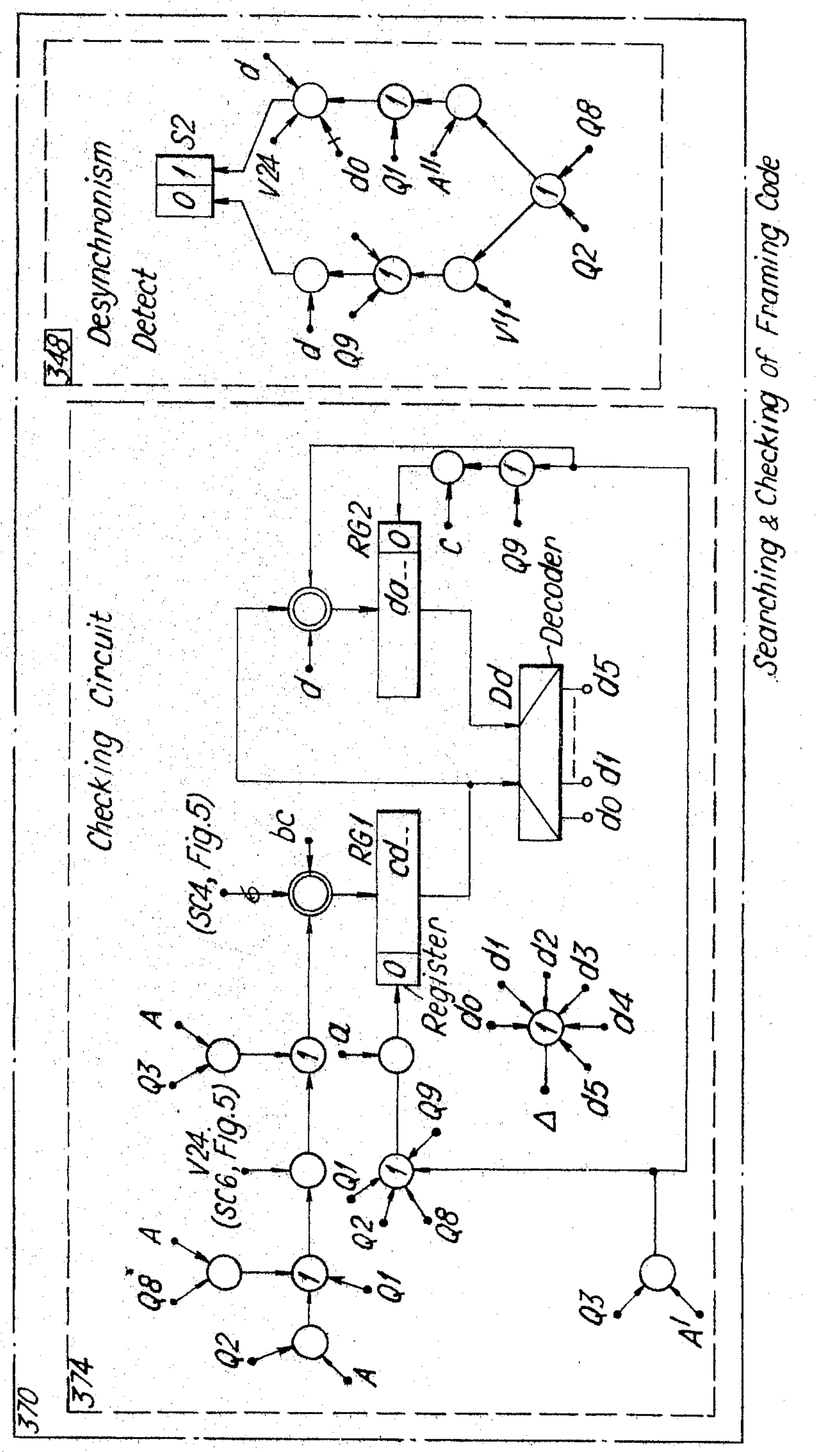
Figure 9:
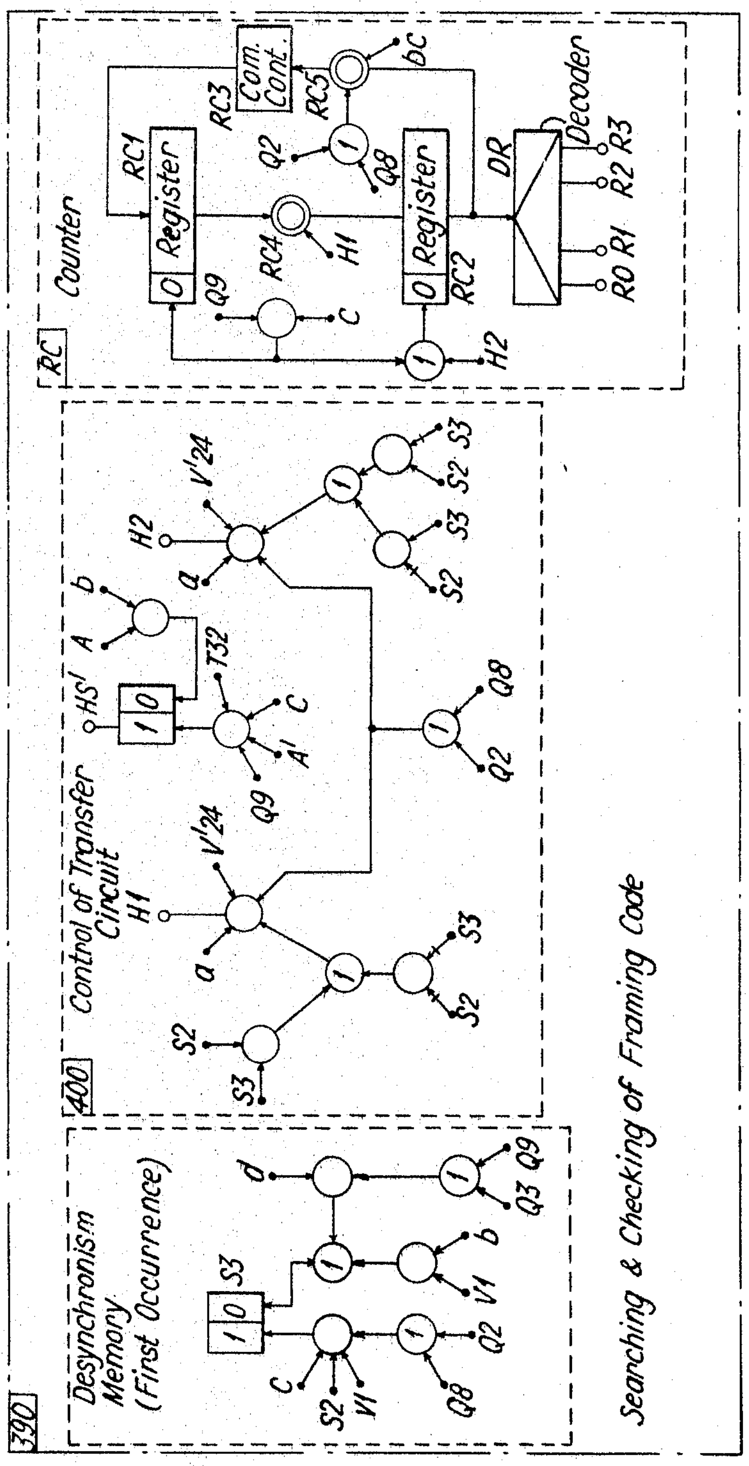
Figure 10:
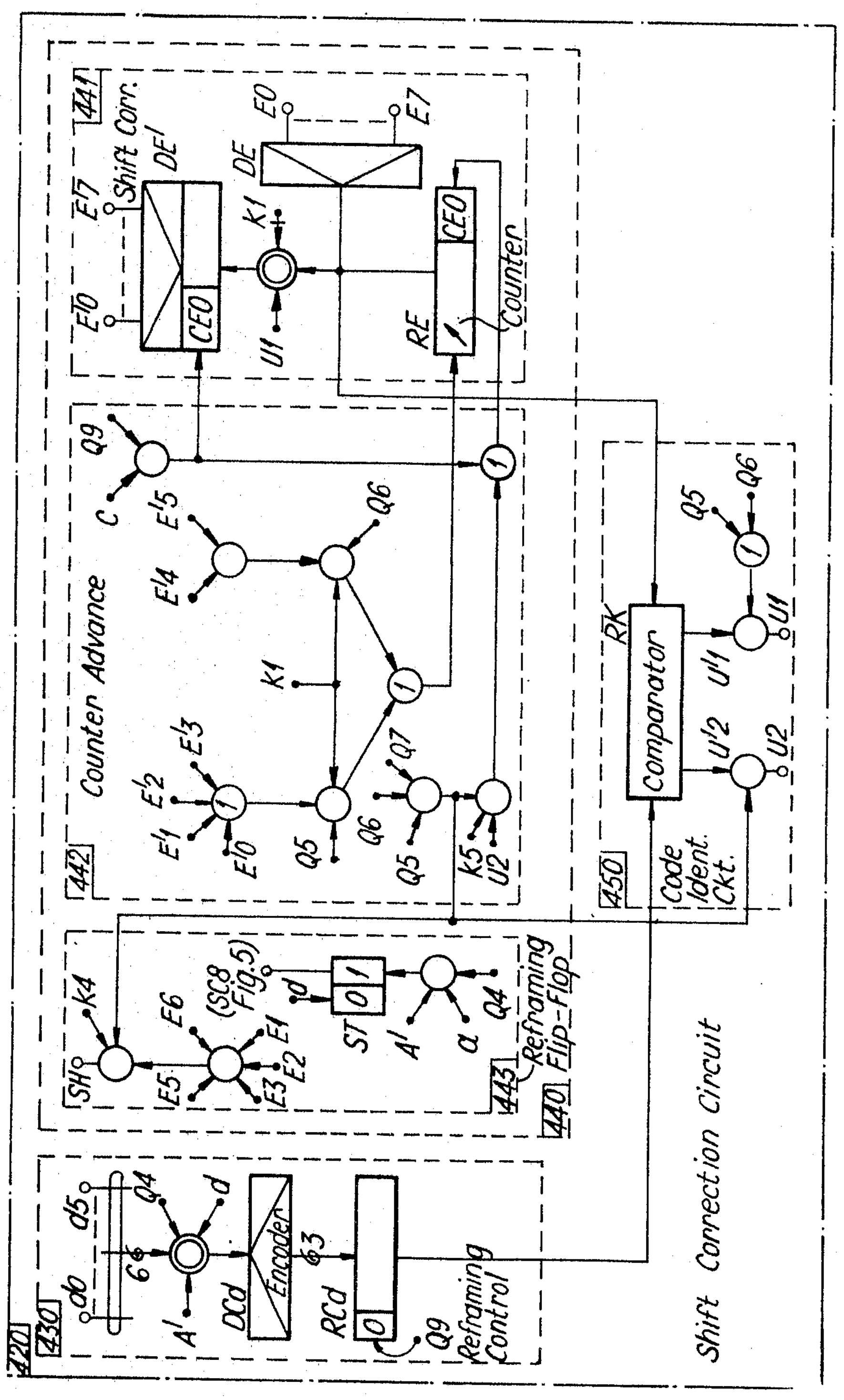
Figure 12:
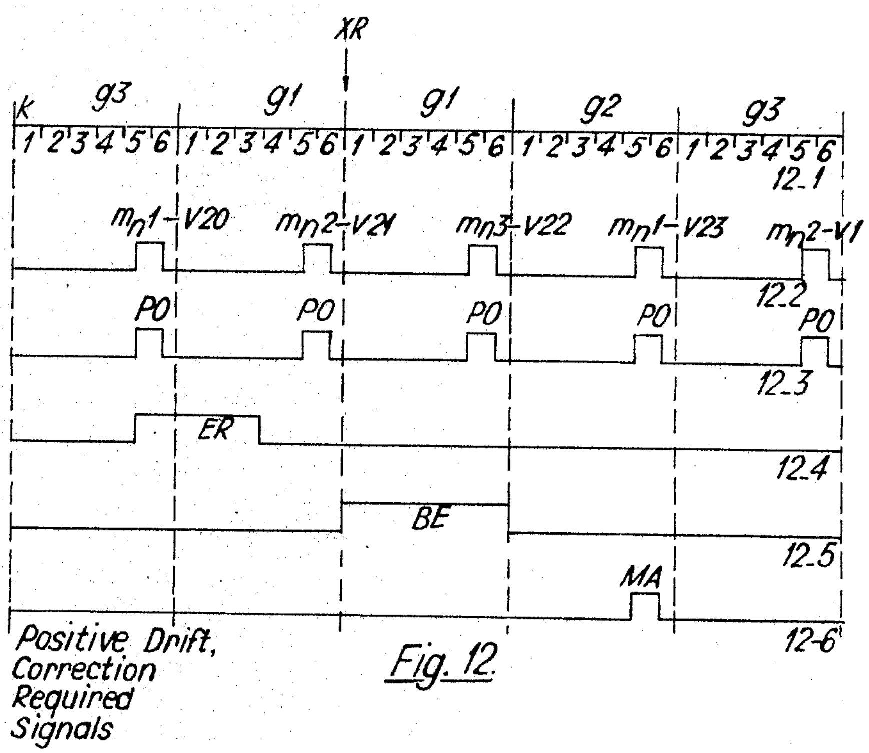
Figure 11:
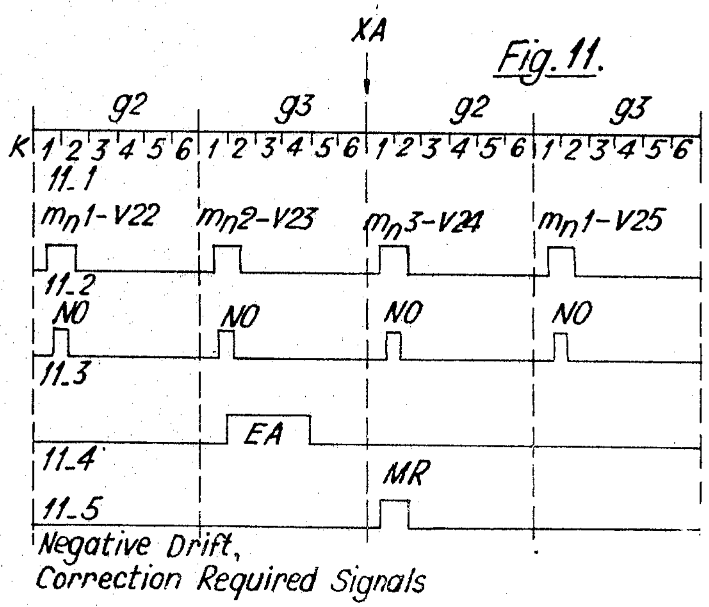
Figure 13:
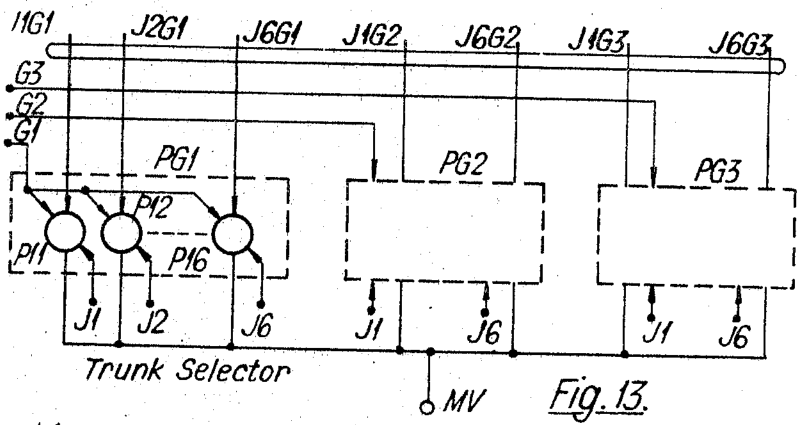
Figure 15:
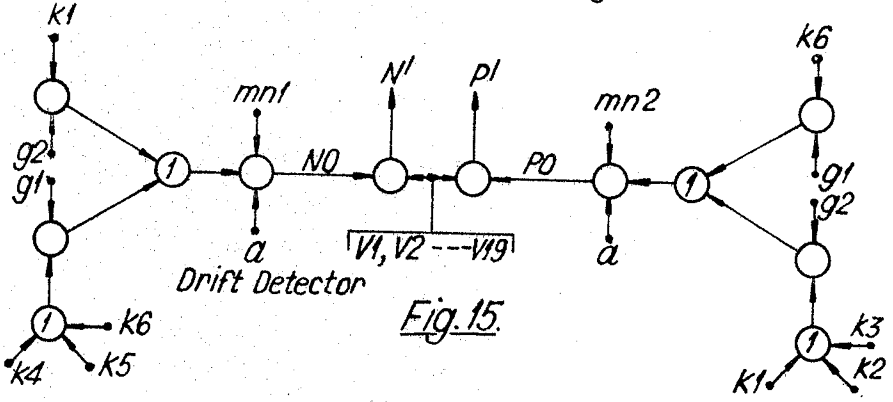
Figure 14:
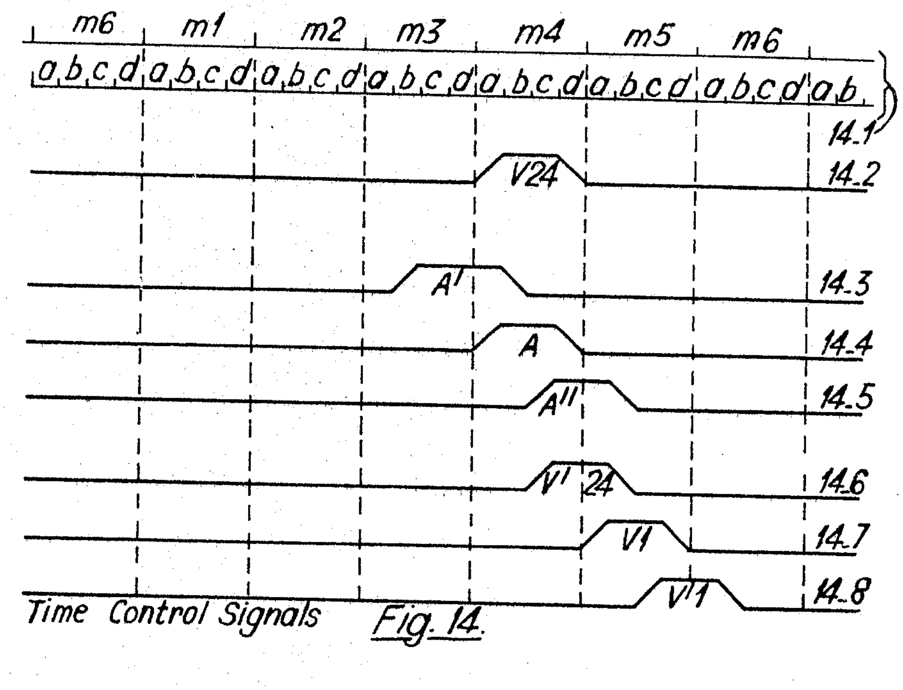
Figure 16:
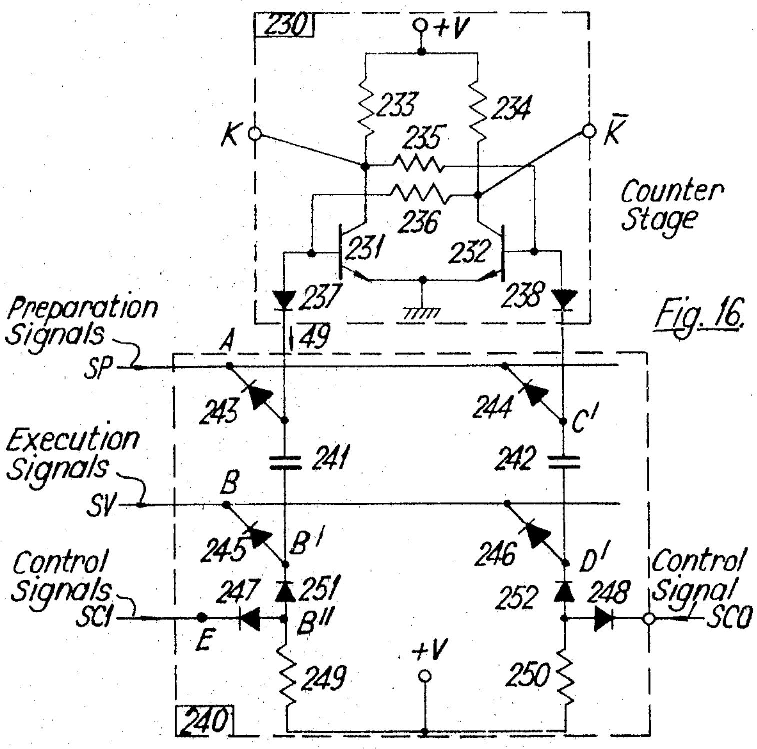
Figure 17:
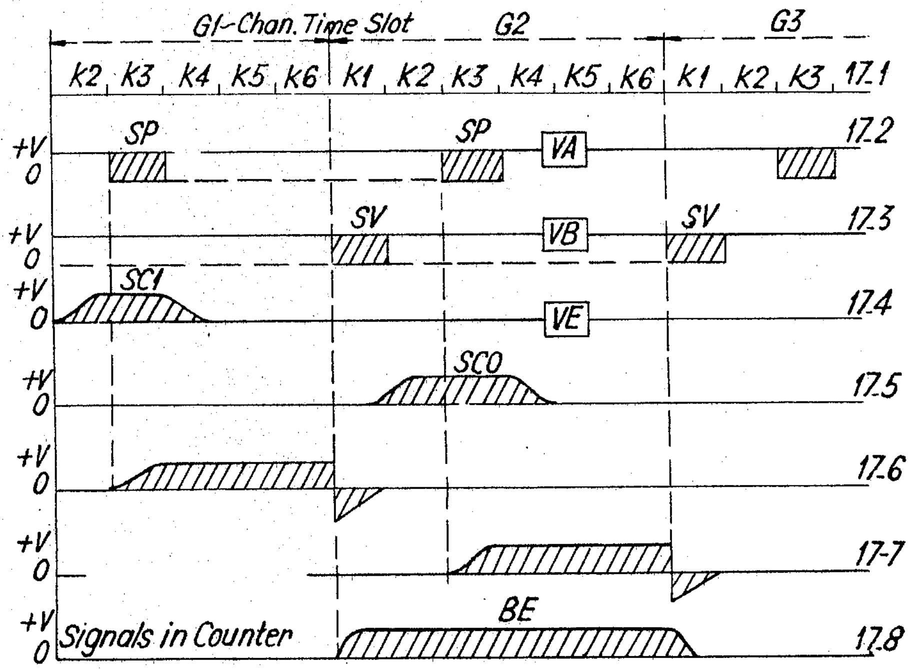
Figure 18:
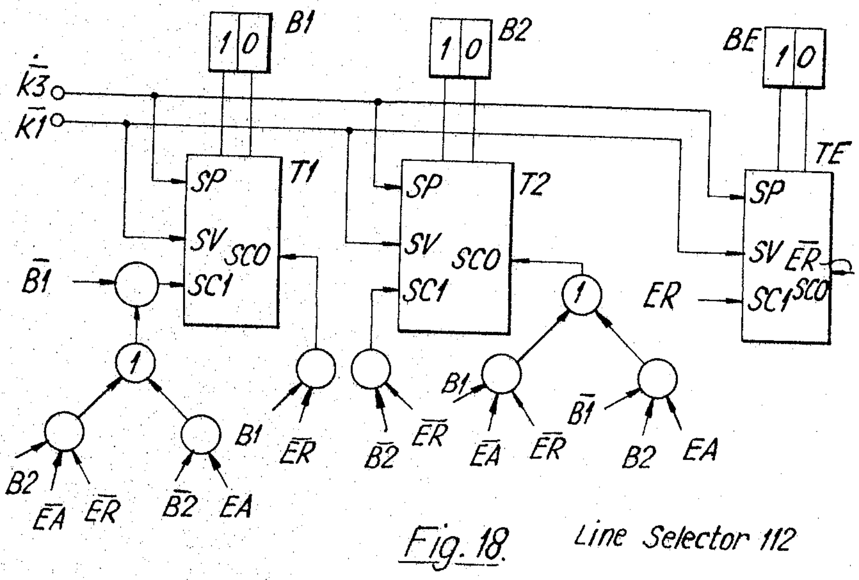
Figure 19:
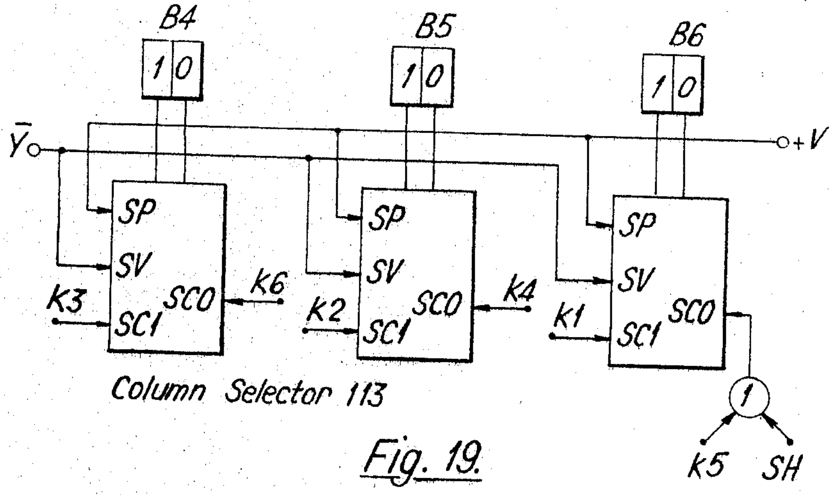
Figure 20:
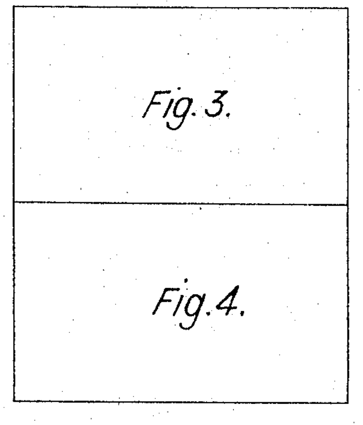
Figure 21:
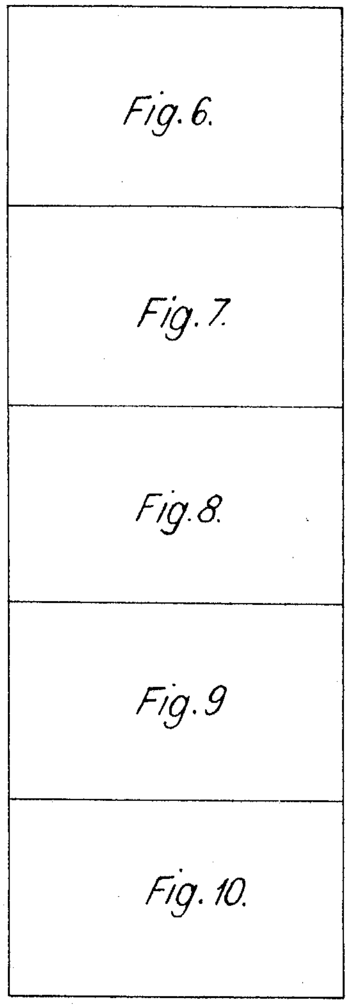

FIGS. 7, 7*a* and 7*b* represent the circuits delivering time control signals;

FIGS. 8 and 9 represent the circuit for searching and checking of the framing code;

FIG. 10 represents the shift correction circuit;

FIG. 11 represents the diagram of signals concerning the drift correction when the drift is negative;

FIG. 12 represents the diagrams of signals concerning the drift correction when the drift is positive;

FIG. 13 represents the general diagram of the selection circuits of a trunk;

FIG. 14 represents the diagram of the time control signals;

FIG. 15 represents the detailed diagram of the drift detector;

FIG. 16 represents the detailed diagram of a counter stage;

FIG. 17 represents the diagrams of the signals which are present in different points of a counter stage;

FIG. 18 represents the general diagram of the line selector 112 (FIG. 3);

FIG. 19 represents the general diagram of the column selector 113 (FIG. 3);

FIG. 20 represents the mode of assembly of the FIGS. 3 and 4;

FIG. 21 represents the mode of assembly of the FIGS. 6, 7, 8, 9 and 10.

Besides, the circuits described in the present invention use a certain number of cyclic memories which may be classified, for the sake of clarity of the description, into three distinct types: the message stores, the semi-permanent memories and the instruction memories.

A common characteristic to all these memories which comprise $r_0$ rows, which store each a number of $c_0$ digits, is that at least one of the read or write operations is carried out in a cyclic way under the control of $r_0$ address selection signals applied successively and cyclically to the $r_0$ rows of the memory.

A message store which comprises *p* columns for the storage of the *p* digits of a message, and a number of addresses which depends upon its function, is characterized by the fact that the write time of each message is limited. One will use, in the described circuit:

The phase corrector which is a memory comprising three lines and in which a message is written during at most two channel time slots. In this memory, the write and read operations are carried out cyclically.

The data store comprising twenty-four addresses assigned to the twenty-four channels of a trunk and in which the messages are written cyclically and are read asynchronously. In this memory, a given message is stored for, at most, one frame period.

Figure 1:
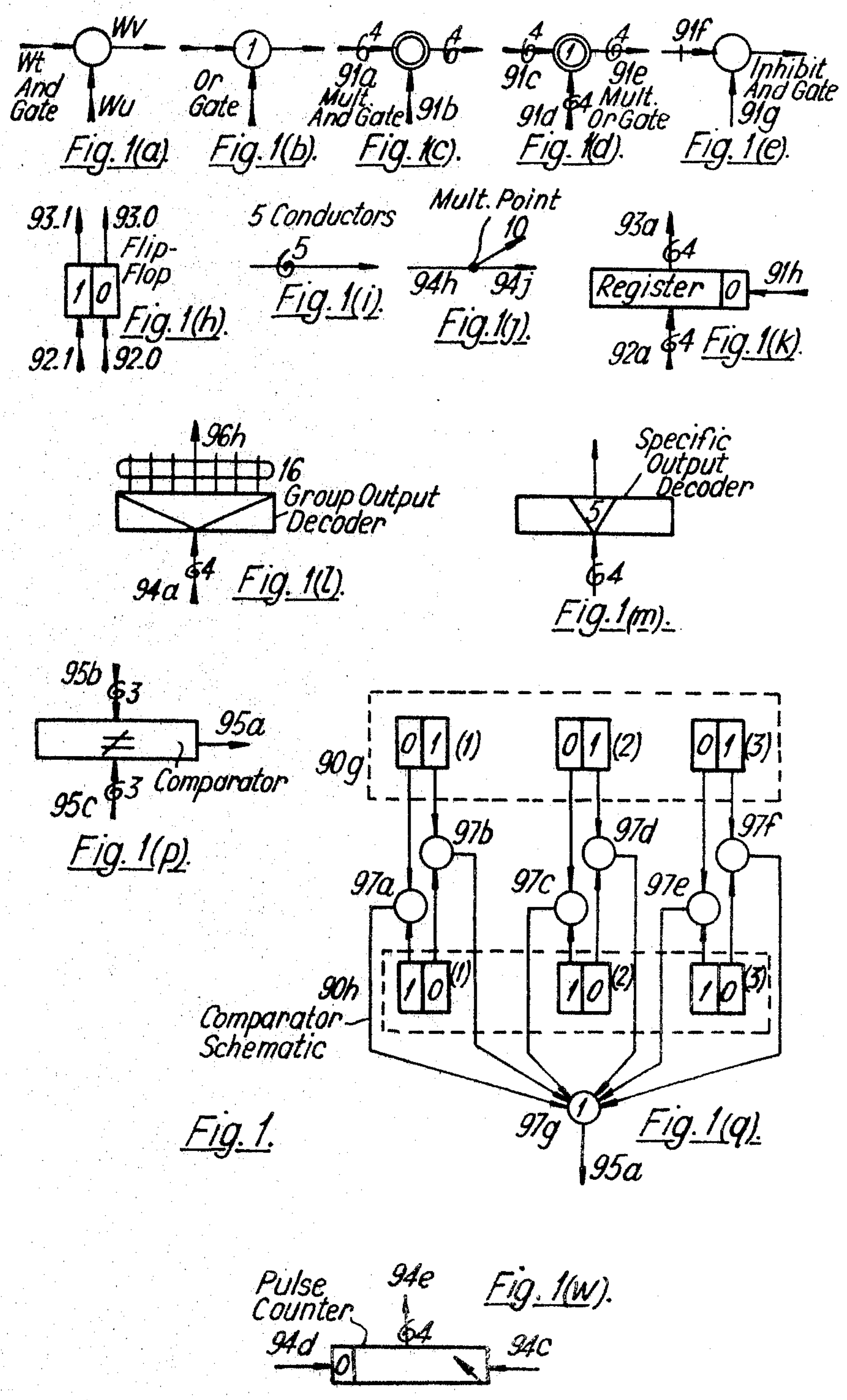
FIG. 1 represents a certain number of symbols used in the following drawings.
Figure 2:
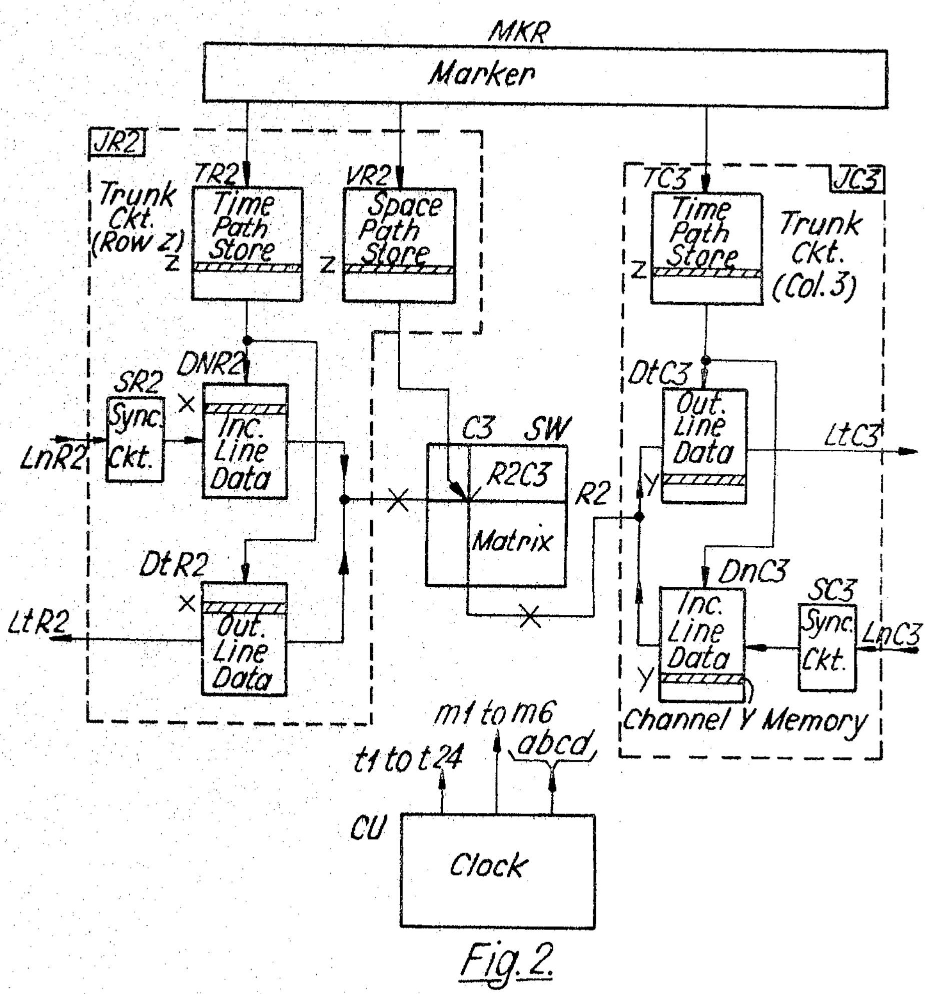
FIG. 2 represents the diagram of a PCM switching stage.

The expression "semi-permanent memory" designates, in this description, memories in which the informations may be kept as long as necessary and are regenerated at regular intervals. These memories comprise twenty-four addresses read asynchronously. One will use in the described circuits:

The path store in which are written the address selection instructions for data store readout or for path connection in the switching stage (see description in FIG. 2).

The fault memory and the error memory (see description of the FIGS. 3 and 8).

Last, an instruction memory comprises a certain number of lines read cyclically. The instructions read are used for the write address selection in data stores and, at each reading, the value of the address is increased by one unit before re-writing for obtaining a cyclic selection.

To facilitate the reading of the description of the invention, this latter will be divided into five chapters divided as follows:

(1) Study of the switching stage
(2) Trunk and group circuits
(3) Pulse synchronization
(4) Framing
(5) Control selectors of a phase corrector.

(1) STUDY OF THE SWITCHING STAGE

A first mode of achievement of a PCM central exchange such has been defined hereabove, has been described in the article entitled "A local area integrated PCM telephone network" published in the March 1964 issue, page 158, of the review "IEEE Transactions on Communication and Electronics." The organization of the switching stage between multiplex trunks in this first mode of achievement will be described briefly in relation with FIG. 2.

It is assumed that this stage controls the setting up of connections between any one of the channels of *n*1 row trunks and any one of the *n*2 column trunks, it comprises:

A switch SW represented in matrix form and comprising *n*1 rows and *n*2 columns, the row R2 and the column C3 having been alone represented on the figure.

The cross-point of this row and of this column is referenced R2C3;

*n*1 row trunk circuits such as the circuit JR2 represented on the figure;

*n*2 column trunk circuits such as the circuit JC3 represented on the figure.

The elements located in the row and column trunk circuits carry references the two last characters of which are respectively "R2" and "C3." The row trunk JR2 comprises:

The incoming and outgoing line data stores referenced respectively D*n*R2 and D*t*R2;

The time path store TR2;
The space path store VR2;
The synchronization circuit SR2.

The column trunk JC3 comprises the same elements with the exception of the space path store.

The clock CU supplies the time signals *t*1 to *t*24, *m*1 to *m*6, *a*, *b*, *c* and *d* which have been defined hereabove.

If it is assumed that the signals received on the incoming line L*n*R2 of the trunk JR2 are not affected by any perturbations, they are written successively in the addresses reserved to them in the data store D*n*R2 in such a way as the signals of the channel 1 are written on the line 1, etc. the signals of the channel *x* being written on the line *x*.

In the same way, the signals received on the incoming line L*n*C3 of the trunk JC3 are written in the addresses which are reserved to them in the memory D*n*C3, the signals of the channel *y* being written on the line *y*.

If it is wished to set up, at a channel time slot *tz*, a connection between the channel *x* of JR2 and the channel *y* of JC3, one controls first—from a marking circuit MKR having access to all the trunk circuits of the central exchange—the writing of the codes C*x* and C*y* on the line *z* (line read at the time *tz*) of the memories TR2 and TC3 and the writing on the line *z* (line also read in *tz*) of the memory VR2 of the code C(R2C3); the codes C*x*, C*y* controlling the read selection of the addresses *x* and *y* of data stores of trunks JR2, JC3 and the code C(R2C3) controlling the selection, in the switch SW, of the crosspoint R2C3.

Further on, at each time *tz*, the instructions extracted from the path stores control the bi-directional transfer of the messages between the two trunks, a first half of this time being reserved to the transmission of JR2 towards JC3 and the other half to the transmission of JC3 towards JR2.

The instructions control, during the whole duration of the time *tz*, the selection of the crosspoint. They also control:

(a) During the first half of the time *tz*:
the read selection of the address *x* in D*n*R2;
the write selection of the address *y* in D*t*C3;
(b) During the second half of the time *tz*:
the read selection of the address *y* in D*n*C3;
the write selection of the address *x* in D*t*R2.

In the article quoted hereabove, this bi-directional data transfer is carried out in a series form.

One has described in the U.S. Pat. 3,281,536 assigned to the assignee of this invention, a search process for a channel time slot *tz* at which the trunks JR2 and JC3 were simultaneously free, so that the connection could be set up at that time. The presence of the data stores enables, when such a channel time slot does not exist, to find out another one provided that at least one channel be free on the called trunk, this search being carried out by "re-arranging" one or several connections already set up according to the descriptions in the U.S. Pat. 3,049,593 assigned to the assignee of this invention; Pat. 3,281,537 entitled: assigned to the assignee of this invention.

The synchronization circuits SR2 and SC3 which are the object of the present invention are used for correcting the effect of the disturbances brought by the transmission medium and will be described in relation with the following figures.

In the present invention, the transfer of data between row trunks and column trunks is carried out in parallel form and the setting up time of each connection is one digit time slot. To that effect, a certain number *w* of groups of trunks G1, G2, G3 . . . G*h* . . . G*w* has been constituted, each one comprising as many trunks as each message comprises digits, viz. six trunks: J1, J2 . . . J6. Thus, 24×6 connections may be set up simultaneously and the system behaves, in the switching stage, in the same way as a multiplex system with 144 channels.

In each group, a particular digit time slot is reserved for the treatment of each one of the trunks, the digit time slot *m*1 being reserved for the trunk J1, the digit time slot *m*2 for the trunk J2, etc. Thus, if it is assumed that the synchronization code is received in *t*24, on trunk J3, the message of the channel 1 will be treated in *t*1.*m*3 the message of the channel 2 in *t*2.*m*3 . . . etc.

The trunk data stores which were described in relation with FIG. 2 are then grouped by six in order to constitute a *group data store* comprising 144 lines. If V1, V2 . . . V24 designate the addresses of a trunk data store, the group data store will comprise the address V1.J1, V2.J1 . . . V24.J1 reserved for the trunk J1 and selected by the digit time slot signal *m*1; V1.J2, V2.J2 . . . V24.J2 reserved for the trunk J2 and selected by the digit time slot signal *m*2 etc.

(2) TRUNK AND GROUP CIRCUITS

FIG. 3 represents the diagram of a trunk circuit JC*n* associated with the incoming line L*n* of the trunk J*n* which is part of a group of six trunks constituting the common circuit G*cb*. The incoming line L*n* supplies, through a gate 102, which may be blocked by a signal BE, a regenerative repeater 101 of conventional design which supplies, on its output 11, normalized message signals of a duration of 100 nanoseconds, and on its output 12, reference signals Y of duty factor 0.5 which are at the average frequency of the received signals.

The reference signals are applied to a six-position selector 113 which marks successively and cyclically one of six output conductors, thus supplying the signals *k*1 to *k*6 having each a duration of one digit time slot at the trunk time. The trailing edge of the signal *k*6 controls the advance of the three position selector 112 which marks successively and cyclically one of three output conductors supplying the signals *g*1, *g*2, *g*3. The signals *k*1 to *k*6 are used for selecting the columns, and the signals *g*1 to *g*3 are used for selecting the lines during the writing in the phase corrector 111 of the normalized message signals which appear in series in the output 11 of the repeater 101. When the circuit operates normally, a six-digit message will be written in the six memory cells of one line. The extraction of the information is carried out in parallel, i.e. a message stored on one line of said phase corrector 111 is extracted during the digit time slot *mn* associated with this trunk. To this effect, the clock CU (FIG. 2) is so designed that it supplies, by dividing by three the signals *mn*, signals *mn*1, *mn*2, *mn*3 which control respectively the reading of the lines 1, 2 and 3 in the memory 111; more precisely, the reading is carried out at the time *mn.a* (basic time slot *a* of the digit time slot *mn*).

The output signals of the memory are applied to the register 198 (FIG. 4) of the group common circuit GC*h* where they are available during the times *b* and *c* of the digit time slot *mn*. The register 198—which is reset to zero at time *d*—is common to the six trunks so that, during a frame period, it writes successively one message of each one of the channels of the six trunks of the group. The content of the register 198 is transferred to the group data store 200 at time *mn* $(b+c)$ and it is written in the address assigned to the channel and to the trunk from which the message comes, this address being delivered by the circuit 150 as it will appear further on. The counters of the selectors 112 and 113 which must be able to modify eventually the counting sequence, will be described in detail in relation to the FIGS. 16 to 19.

The write address selection for the group data store 200 (FIG. 4) is obtained by decoding an address instruction delivered by the group instruction store 151. This memory comprises six lines read cyclically, at the basic time slot *a*, by the signals *m*1 to *m*6 so that each one of the lines is associated with one of the trunks of the group. Each code read is transferred in the register 156 where it is available at times *b* and *c*. This code is, on the one hand, applied to the line selector of the memory 200, and on the other hand, to the circuit 161 which delivers a code higher by one unit than the code applied to it. This new code is written at the time *c* on the line of the memory 151 which has just been read. The different codes which may be written on each one of the lines will be referenced CV1 to CV24; the circuit 161 being provided for supplying the code CV1 when the code CV24 is applied to it.

Thus, line selector of the memory 200 receives the codes CV1 to CV24 as well as the signals *m*1 to *m*6 and it combines them so that it delivers the 144 selection signals V1.J1 to V24.J6 defined previously.

The read selection, in the memory 200, is carried out under the control of a time path store similar to that described in relation with FIG. 2. This memory (of any suitable, known form) has not been shown on FIG. 3, but it will be noted that it comprises 144 lines in the considered case. The messages read are transmitted to the switch over the group of conductors 22.

In each trunk circuit, the drift detection is carried out by comparing, in the drift detector 130 (FIGS. 3 and 15), the signals at the trunk time *k*1 to *k*6 delivered by the selector 113 to the signals *mn*1 to *mn*3 at the central exchange time.

One thus obtains, according to the sign of the drift, a signal N*o* or P*o* which indicates that the drift has reached a value such that it must be corrected in order to avoid the occurrence of an error. These signals are used only during the channel time slots V1 to V19 for reasons which will be made clear further on, and are referenced N′ and P′.

This information, elaborated in the trunk circuit JC*n*, is transferred to the circuit 150 of the trunk group circuit GC*h*. It is stored in one of the flip-flops N or P of the circuit 157, and is then transferred in the error memory 152 which comprises as many lines as the memory 151, this writing being carried out on the line assigned to this trunk.

As it will be seen further on, this error information is used to carry out the drift correction which consists in controlling, at the selection time of an address V20, V23 or V24 (FIG. 4), a modification of the writing time of the message in the phase corrector 111 and the advance of the instruction memory 151. To this effect, it is extracted from the error memory 152 at the digit time slot *mn* assigned to the considered trunk, and it is applied to the circuits which elaborate the error correction information and which comprise on the one hand two flip-flops EA and ER (FIG. 3) placed in the trunk circuit JC*n* and on the other hand, two logical circuits which are associated with the circuit 161 (FIG. 4) of the circuit GC*h* and which deliver signals MA and MR.

The detection of a synchronization fault is made by comparing, in the circuit DS (FIG. 4), the framing code of the messages which are written in the register 198. The comparator DS supplies a signal $\overline{DS}$ when the message is different from the framing code, and for the condition V24 *x* $\overline{DS}$ *x* $\overline{HS1}$, the flip-flop F sets to the 1 state. It delivers thus a "framing fault" signal referenced F when a framing code CS*y* does not coincide with a signal V24, this signal F being transmitted to the channel framing common circuit XCV (FIGS. 8 to 10). It will be noted that this flip-flop is common to the six trunks of a group, so that the presence of a signal F characterizes the fact that a trunk of this group is desynchronized without giving its identity.

The messages read in the phase correctors which are the output signals of the register 198 (FIG. 4) as well as certain signals at the trunk time *k*1, *k*4, *k*5, *k*6 (FIG. 3) are also transmitted to the circuit XCV.

The information received by the circuit XCV are used for carrying out the operations of examination of the framing code, of research of the said code and of checking, which will be described in relation with the FIGS. 8 to 10.

When a trunk is desynchronized, these operations enable the circuit to find the code CS*y* and to determine its phase shift with respect to the address of a message in the phase corrector. This phase shift information enables the elaboration of phase correction signals which are transmitted from the circuit XCV to the trunk circuit JC*n*.

(3) PULSE SYNCHRONIZATION

(3.1) General description

As it has been stated hereabove, the frequency $F_J$ of the signals *k*1 to *k*6 which is the average frequency of the signals received on a trunk, J*n* for instance, is not exactly the same as the frequency $F_C$ of the signals *m*1 to *m*6 supplied by the central exchange clock and which are utilized for extracting the information from the phase corrector 111 (FIG. 3). The message signals are registered successively in the six memory cells of line 1, then in the six cells of line 2 and so on. The address selection is controlled by the signals delivered by the selectors 112 for the lines and 113 for the columns, as it has been described hereabove. The information contained in a line are read in parallel form at the time *mn* associated with the trunk J*n* and, more precisely, at the time *mn.a* As it has been seen previously, the clock CU (FIG. 2) supplies signals *mn*1, *mn*2, *mn*3 which are used for controlling successively and cyclically the reading of the lines 1, 2 and 3 of the memory 111. Obviously, a line must be read after writing is completed and before new information are received.

If the frequency $F_C$ of the central exchange clock is higher than the average frequency $F_J$ of the signals on the trunk J*n*, i.e. if $F_C > F_J$, it is understood that, as an average, more information is extracted from the memory 111 than is written therein so that if there was a shift, at the beginning, between the digit time slot reserved to the reading of a given line and the time at which the last signal (in *k*6) has been written on the same line, this shift decreases. By way of an example, it will be assumed that the digit time slot *mn*1 at which the line 1 is read coincides with the writing, in the fourth memory cell of the line 2 selected by a signal *g*2. If the difference between the count of the signals of frequencies $F_J$ and $F_C$ is of one unit after one second, the digit time slot *mn*1 coincides then with the writing in the third memory cell of the line 2, and so on.

(3.2) Drift detection and error storage

In the circuit according to the invention, it is agreed to elaborate a drift signal N*o*—in the case $F_C > F_J$—when the reading of a line is carried out, at least partly, during the time *k*1 which follows immediately the writing in k6, in the last memory cell of this line. The comparison between the signals HC and HJ is carried out only during the reading of the line 1 of the phase corrector 111 and this signal is elaborated (circuit 130—FIGS. 3 to 15) for the condition:

$$No=g2\ x\ k1\ x\ mn1\ x\ a$$

In the case where $F_C<F_J$, the drift between the digit time slot at which a given line is read and the time at which the last signal has been written in *k*6, on the same line, increases and the number of digits stored in the memory increases. Since the memory has a limited capacity, viz. three lines of six memory cells each, the content of the line 2 for instance, is read when the number of digits written in the memory reaches 17, while the writing of the line 1 is completed. If the frequency difference lasts, the reading of the line 2 will be carried out while new information begin to be written therein.

In the circuit according to the invention, it is agreed to elaborate a signal P*o* when the digit time slot *mn*2 at which the line 2 is read coincides at least partially with the time *k*6 at which writing takes place in the sixth memory cell of the line 1, viz. $Po=g1\ x\ k6\ x\ mn2\ x\ a$.

For reasons which will be stated during the study of the drift correction concerning in particular the channel framing, signals N*o* and P*o* are also elaborated for the following logical conditions (see (FIG. 15):

$$No=g1\ x\ (k4+k5+k6)\ x\ mn1\ x\ a$$

$$Po=g2\ x\ (k1+k2+k3)\ x\ mn2\ x\ a$$

The signals N*o* and P*o* are transmitted to the common circuit GO*h* (FIG. 4) only during the times V1 to V19, the times V20 to V24 being used for correcting the drift. These signals, which are then referenced N' and P' (FIG. 15), are applied to the flip-flops N and P (FIG. 4) which constitute the output register of the section 152 of the memory 150 where they are mixed with the output signals N'' and P'' of the memory. The meaning of these signals is the following:

the condition $N''\ x\ \overline{P}''$ means that a correction must be carried out in the case where $F_C>F_J$;
the condition $N''\ x\ P''$ means that a correction must be carried out in the case where $F_C<F_J$;
the condition $\overline{N}''\ x\ \overline{P}''$ means that no correction must be carried out on the considered trunk.

It is realized that, due to the mixing of the signals N' and N'' on the one hand, and P' and P'' on the other hand, flip-flops N and P could, in particular when $F_C=F_J$, shift both to the 1 state, this corresponding to the logical condition N *x* P. Owing to the condition $N\ x\ \overline{P}\ x\ (b+c)\ x\ \overline{V24}$ set up at the onput of the amplifier 162, the condition N *x* P controls the blocking of the rewriting of the condition N in the corresponding line of the memory. It results therefrom that, at the next reading, the memory supplies the condition $\overline{N}''\ x\ P''$ which will control a correction such as the condition $N'\ x\ P'$ should not occur any more.

As a general rule, from time V20 on, only the conditions $N\ x\ \overline{P}$, $\overline{N}\ x\ P$ or $\overline{N}\ x\ \overline{P}$ may thus occur.

(3.3) Drift correction

The information stored in the output register of section 152 are used for controlling the drift correction.

FIG. 11 represents a number of signal diagrams which appear during this operation, in the case where the output register of the memory 152 is in the condition $N\ x\ \overline{P}$, this corresponding to the case where $F_C>F_J$.

On this figure, one has shown on line 11.1 the output signals of the selectors 113 and 112, one line 11.2 the read selection signals of the phase corrector 111 and the addresses of the memory 200 to which the messages are transferred over, and on line 11.3, the signals N*o*.

The condition N controls in V23 *x mn* the setting to the 1 state of the flip-flop EA*n* (FIG. 3) which delivers a signal EA*n* represented on the line 11.4, this flip-flop being reset to 0 state in *k*4. It will be noted that *mn* coincides at least partially with *k*1 owing to the fact that the condition necessary for the occurrence of the signal N*o* is $g2\ x\ k1\ x\ mn1\ x\ a$, so that the signal EA*n* appears at least partially during time *k*2 and is certainly present during time *k*3. This signal is applied to the selector 112 which advances then by two steps at the end of the signal *k*6 following immediately the signal *k*3 which coincides with EA*n*, the time at which this jump is carried out being referenced XA on the diagram of the line 11.1. It results therefrom that, if during time V23, the signal *mn*2 for instance (reading of the line 2) coincided with the writing in the first memory cell of line 3 (condition $g3\ x\ k1$), the next signal *mn*3 during which the line 3 is read coincides, owing to the jump XA, with the writing in the first memory cell of line 2 (condition $g2\ x\ k1$), this increasing the time interval between the reading and the writing by an amount of six digit time slots. In the case considered, the signal EA*n* coincides with V23 and *mn*2 and the message stored in line 2 of the phase corrector 111 is normally transferred in the address V23.J*n* of the memory 200 and, if one does not interfere in the process of elaboration of the writing addresses in the memory 200, the next message, read from line 3, is transferred in the address V24.J*n* and that read from line 1 is transferred in the address V1.J*n*. But owing to the jump imposed to the counter 112, the message received over the channel V1 is written in line 2 instead of being written in the line 1. In order to take this into account, a signal MR (condition N *x* V24) represented on the line 11.5 acts over the re-writing circuit 161 of the instruction memory 151 which supplies the writing addresses in the memory 200. When the signal MR appears (at the time *mn*) the register 156 contains the code corresponding to the address V24.J*n* in the memory 200. The circuit 161 which controls, in the absence of the signal MR, the re-writing in the memory of the address code CV2 following CV1 controls, in presence of the signal MR, the writing of a code CV25 to which does not correspond any address in the memory 200. Thus, the content of line 1 of the phase corrector in which nothing has been written, cannot disturb the information received and the occurrence of a second signal V24 which might disturb other circuits, is avoided. The circuit 161 is provided for controlling the re-writing of the code CV1 in response to the reception of the code CV25 under the control of a signal MR. At the next cycle, the line 2 of the phase corrector which contains the message received over the channel 1 is read and this message is written in the memory 200 at the correct address V1 given by the register 156.

FIG. 12 represents, on the lines 12.1 to 12.6, a number of signal diagrams appearing during the drift correction in the case where the output register of the memory 152 is in the condition $\overline{N}\ x\ P$, which corresponds to the case where $F_C<F_J$. This condition controls the elaboration of a signal ER by setting the flip-flop ER (diagram 12.4) in the 1 state for the condition *mn x* V20 *x* P and of a signal MA for the condition P *x* V23. In this case, as described hereabove, the reading of the line 2 of the phase corrector (signal *mn*2) is carried out while writing takes place in the last memory cell of the line 1. The one among the signals *mn* (*mn*1 for instance) which appears at the same time as the signal V20 and controls then the reading on line 1 of the message received from the channel 20, coincides thus with the end of the writing in the line 3 of the message received from the channel 22. The signal ER, which appears at least during the following times $k1+k2+k3$, is present during the writing in line 1 of the code received from the channel 23. This signal is applied to the selector 112 in order to avoid its advance to the next position, so that the message received over the channel V24 is still directed towards line 1 in which the message received from the channel 23 has just been written.

In fact, in order to avoid that this second writing on the line 1 disturbs the useful message of channel V23, the selector 112 which will be described in relation with FIG. 18, elaborates a signal BE (diagram 12.5) which lasts during the six time slots $k1$ to $k6$ during which line 1 is selected for the second time. This signal BE blocks the electronic gate 102 (FIG. 3) so that the code CS$y$ received over the channel 24 is not written in the phase corrector. During the time V23, which is in this case, the time of reading of the line 1 containing the message of the channel 23, the signal MA is applied to the circuit 161. This circuit elaborates, from the code VC23 contained in the register 156, the code CV1 which is written in the instruction memory 151. During the next cycle, the message received from the channel 1 and stored on line 2 is transferred to the correct address in the memory 200.

(3.4) Performances

It is then easy to determine the permissible frequency difference between $F_J$ and $F_C$ in order that the system operates without any information loss during writing in the group data store 200, i.e. in order that the messages received over the channels 1 to 23 be written at the corresponding addresses in this memory 200, the loss of the framing code not being considered as an information loss. One will consider the case where $F_C>F_J$ in which a signal N$o$ appears as soon as the condition $g2\ x\ k1\ x\ mn1\ x\ a$ is present assuming that this signal is elaborated when the first half of the basic time slot signal $a$ (viz the first eighth of the signal $mn$) coincides with $k1$. It is clear that the correction controlled by the signal N which is initiated in V23 and executed in V24, must be completed before the relative drift between the signals $k1$ and $mn$ be such as $mnq$ ($q$=1, 2, 3) coincides—even partially—with the writing in $k6$ in the line $q$. This implies that the drift should be lower than ⅞ of digit time slot between the time where the signal N$o$ appears and the time where the correction is carried out. The longest time interval between these two operations occurs when the coincidence starts in V20. In this case, a signal N is obtained only during time V1, and the correction is executed at the next time V24. Thus, at most 27×6=162 digit time slots elapse between the detection and the correction and, in the course of this time interval, the drift must be lower than ⅞ of digit time slot. This implies that the frequency difference remains lower than $$F_C\cdot\frac{7}{162\times 8}\cong\frac{F_C}{184}$$

or $F_C$=1,152 kc., a frequency difference of about 6.2 kc. A more accurate analysis which is beyond the scope of the present description, which would take into account the fact that the signal N can appear only once every eighteen digit time slots, would lead to a slightly lower figure. However, it must be noted that the permissible frequency difference ranges about $5.10^{-3}$ whereas the clock units used in the central exchange office considered as well as in the office located at the end of the trunk, are easily stabilized to within $10^{-5}$ so that the maximum difference between the basic clocks is $2.10^{-5}$, this leading to reserve a difference of $498.10^{-6}$ for the fluctuations resulting from the factors which affect the propagation. On the other hand, in the circuit according to the invention, it is easy to increase the permissible frequency difference by elaborating the signal N$o$ for the condition $g2\ x\ k2\ x\ mn1\ x\ a$ or even: $g2\ x\ k3\ x\ mn1\ x\ a$ in which case a permissible frequency difference ranging about $17.10^{-3}\ .F_C$ is reached. However, this is obtained at the cost of an increase of the frequency of the corrections in the case where the sign of the frequency difference changes quickly, due to rapid variations of the propagation conditions.

An identical analysis in the case where $F_C<F_J$ leads to figures of the same order, the only difference coming from the fact that the correction is effective at the beginning of the time V22, this leading to a permissible frequency difference of $$F_C\cdot\frac{8}{26\times 6\times 7}\cong\frac{F_C}{136}=7.10^{-3}.F_C$$

The same considerations on the possible increase of the permissible frequency difference apply and, in this case, the signal P$o$ might be obtained for the condition $g1\ x\ k5\ x\ mn2\ x\ a$ or $g1\ x\ k4\ x\ mn2\ x\ a$.

(4) FRAMING

(4.1) Selection circuits

The checking of the correct synchronization of the channels, accomplished by verifying, for each trunk, that the framing code is stored in the corresponding address of the memory 200, is carried out by a channel framing circuit XCV, shown on the FIGS. 6, 7, 8, 9, 10. The framing circuit XCV is common to all of the W groups of trunks of the central exchange office. To this effect, the circuit XCV may be connected selectively to a pre-determined group and, in this group, to a given trunk, by means of the selection circuit represented on FIG. 5 comprising the selectors GS and JS and the selection gates SC1 to SC9. The selector GS, which includes as many output conductors as there are groups of trunks, viz, W, marks an output conductor characterizing the group which is connected to the circuit XCV. The selector JS is of the two register types JS1, JS2 an its decoder JSD marks one of its output conductors characterizing the group trunk which must be connected to the circuit XCV. The operation of this counter is well known, and it will be only briefly described. When a code corresponding to the number $n$ is contained in the register JS1, the output terminal associated to the trunk J$n$ is marked. When the electronic gate JS3 is open, this code is applied to the circuit JS4 which delivers the code corresponding to the number $n+1$ which is written in the register JS2. When the electronic gate JS5 is opened, the code corresponding to the number $n+1$ is transferred in the register JS1 so that the output terminal corresponding to the trunk $Jn+1$ is the one which is then marked.

If the code used inside the counter is a cyclic code such as the one shown on Table I, the transfer circuit JS4 may be constituted in a known classical way by means of a circuit which makes correspond the number $a1\ a2\ a3$ ($a1\ a2\ a3$ being binary digits) to the number $\overline{a3}\ a1\ a2$ this being obtained by shifting the number by one rank to the right, the last digit on the right $a3$ which is dropped, being used after inversion, for constituting the first digit of the new number.

TABLE I

| | | | |
|---|---|---|---|
| 1 | 0 | 0 | 0 |
| 2 | 1 | 0 | 0 |
| 3 | 1 | 1 | 0 |
| 4 | 1 | 1 | 1 |
| 5 | 0 | 1 | 1 |
| 6 | 0 | 0 | 1 |

Each one of the selection circuits SC2, SC3, SC4, SC6 to SC9 is constituted by as many electronic gates as there are groups of trunks, i.e. $w$ gates, the output terminal of these gates being connected in parallel to the common circuit XCV. Each gate is also connected to a group circuit, for instance GC$h$, and it is activated by the corresponding signal $Gh$. The circuits SC1 and SC5 which connect selectively the circuit XCV to a given trunk of a group, are controlled by the output signals of the selectors GS and JS. An example of a selection circuit SC$j$ has been shown on FIG. 13, in the case of a central exchange comprising three groups of trunks. This circuit comprises 3×6=18 input terminals J$n$.G$h$ (n=1, . . . 6; $h$=1, 2, 3) associated with eighteen gates Ph$n$ constituting three groups of six PG1, PG2, PG3. The three gates P11, P12 and P16 have been represented and it is understood that, as a general rule, the gate P*hn* which connects the trunk J*n* of the group G*h* to the output terminal MV of the circuit SC*j* is activated when the signals J*n* and J*h* are present. The selection circuits SC1, SC3, SC4, SC8 and SC9 are used for the transfer of the information towards the circuit XCV. The other circuits are used for the transfer of information from the circuit XCV towards the trunk or group circuits. One has shown on FIG. 5, for sake of clarity, only those gates of the circuits SC1 to SC9 which are used when the trunk J*n* of the group G*h* is connected to the common circuit XCV.

(4.2) Time control circuits

By means of the selection circuit, the common framing circuit XCV is connected successively to each one of the trunk groups and to each trunk of the selected group. The operation of the circuit XCV is controlled by a program of phases Q0 to Q9 elaborated by a phase counting circuit PC represented on FIG. 6 and comprising a counter PC1 which counts from zero to nine, associated to a decoder PC2 which supplies the phase signals Q0 to Q9 on ten output conductors. A register PC3 to which is transferred, after a certain delay, the contents of the counter PC1, is associated with a decoder which supplies signals Q'0 to Q'9 delayed by one to three basic time slots with respect to the corresponding signals Q0 to Q9. On the other hand, by means of the circuit PC4, the counter may be set in the positions 3, 7 or 9 independently of the signals which control its normal advance.

It will be noted that two of said settings in Q9 are obtained under the control of the signals T8 and T32 supplied by the time delay circuit TC (FIG. 7). This circuit comprises a selector TC1 which advances, except during the phase Q0, by one position at each time *t*1 (condition: $\overline{Q0}$ *x t*1), i.e. at each frame period. It supplies signals T8 and T32 respectively eight and thirty-two frame periods after the beginning of the phase Q1, these signals being available during a time *t*2.

The common framing circuit XCV comprises also means for elaborating, from the signals V24, delayed signals V'24, V1 and V'1 (circuit 300, FIG. 7) as well as marking signals of the time *mn* (time reserved to the selection trunk J*n*) which are called A, A' and A'' (circuit 359, FIG. 7).

The flip-flops V'24, V1 and V'1 controlled in consecutive sequence, are used for producing the three delayed signals V'24, V1 and V'1. In the same way, the three flip-flops A', A, A'' also controlled in consecutive sequence, are used for producing the three marking signals A', A, A''. The signals A, A', A'' practically continuous, which are supplied by these flip-flops during the phase Q1 are not used and only the signals produced when the trunk selector JS is stopped on the trunk J*n* have been represented on FIG. 14. The common control circuits which control the elaboration of the marking signals are provided in such a way as the signal A' (diagram 14.3) appears during the time *a* of the digit time slot *mn* associated with the selected trunk J*n* as well as during the times *c* and *d* of the digit time slot *m*(*n*−1) which precedes it immediately.

The signal A (diagram 14.4) appears during the time interval *mn*(*b*+*c*) and the signal A'' (diagram 14.5) during the time *mn x d*+*m*(*n*+1) *x a*. Outside the phase Q1, the signals V24 (diagram 14.2) control the elaboration of the signals V'24 (diagram 14.6) only when the signal A is present (condition: Q1 *x* A*x* V24 *xc* for setting the flip-flop V'24 to the 1 state) so that, during all phases except Q1, the signals V'24 (diagram 14.6), V1 (diagram 14.7) and V'1 (diagram 14.8)—when they exist—are obtained from the signal V24 associated with the selected trunk J*n*. FIG. 14 shows the time relations between the signals V24, V'24, V'1, V1, A, A', A'' during these phases when the time *mn* considered coincides with a signal V24. In the opposite case, only the signals A, A', A' exist.

Table II

| Phases: | Operations |
|---|---|
| Q0 | Cyclical group selection and detection of the group G*h*. |
| Q1 | Cyclical trunk selection and detection of the trunk G*h*.J*n*. |
| Q2 | Verification of the codes transferred in the address V24.J*n* (coincidence or non-coincidence counting). |
| Q3 | Search for the code CS*y* yielding the value of the shift of code CS*y*. |
| Q4 | Storage of the value of the shift and re-framing. |
| Q5 | First part of the shift correction. |
| Q6 | Second part of the shift correction. |
| Q7 | Neutral position. |
| Q8 | Verification of the codes transferred in the address V24.J*n* (coincidence or non-coincidence counting). |
| Q9 | End of operation on the junction G*h*.J*n* (general clearing). |

(4.3) Operation of the channel synchronization circuit (4.31) Identification of a desynchronized trunk (phases Q0 and Q1).—The operation of the circuit XCV under the control of the phase signals Q0 to Q9 will now be described, the various operations being enumerated in the Table II hereabove.

Figure 5:
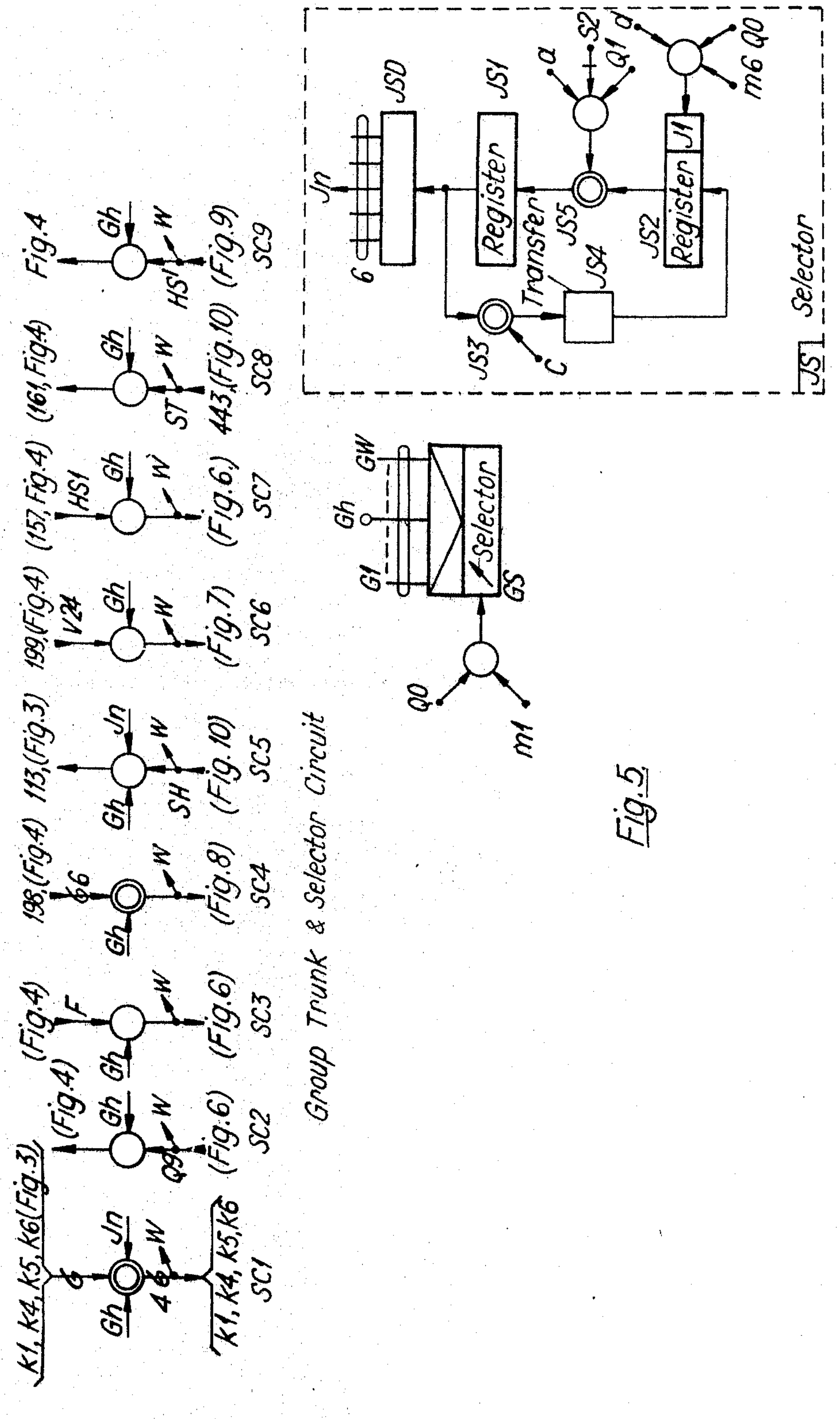
FIG. 5 represents the group and trunk selection circuits.
Figure 6:
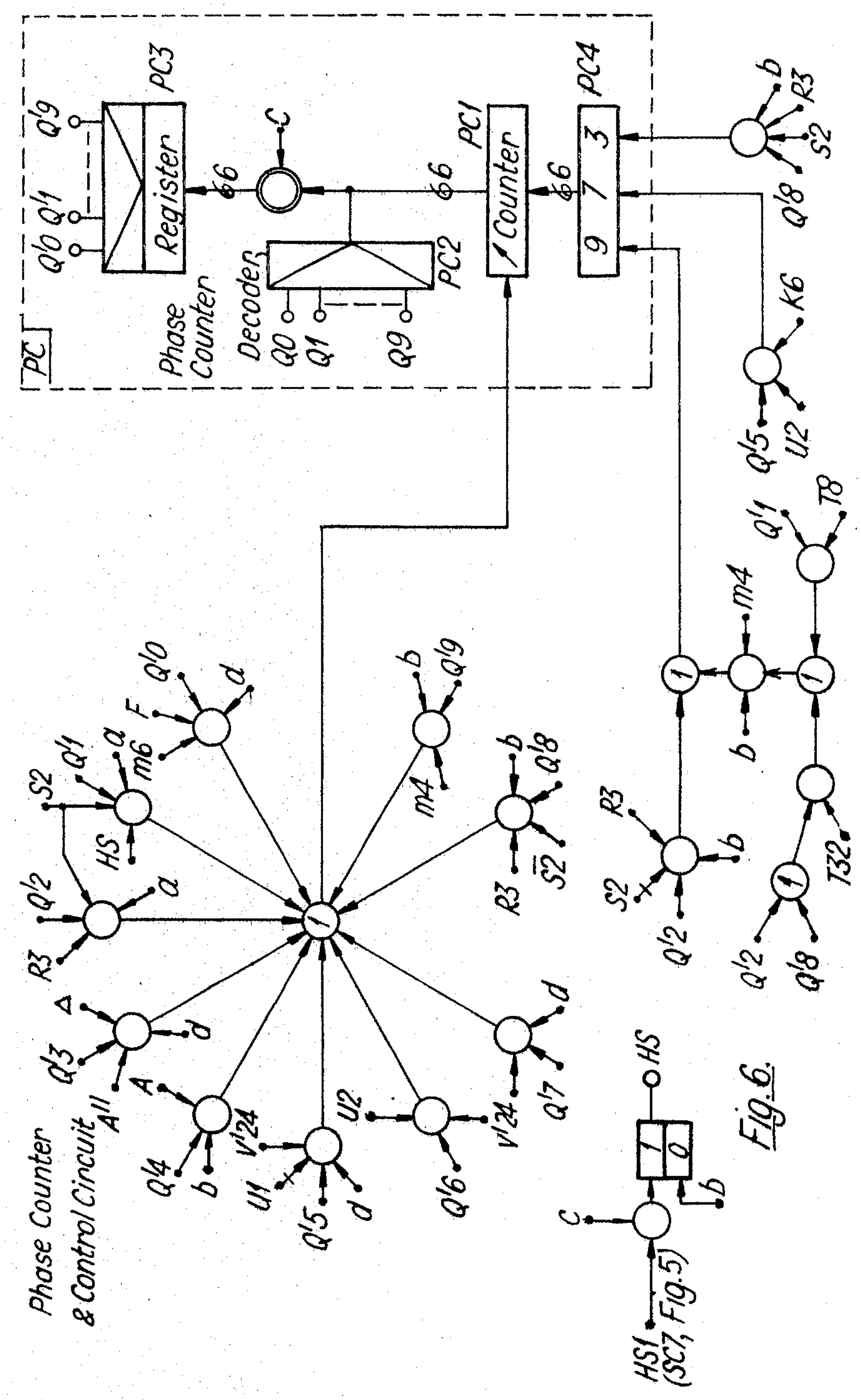
FIG. 6 represents the phase counter and its control circuits.

It will be assumed that the phase counter PC has just set to the position Q0 and that the selector GS delivers a signal on its output G*h* (see FIG. 5). The selector JS, FIG. 5, is reset to the starting position by the writing of the code CJ1 for the condition Q'° *x d x m*6 and in Q0 *x m*1, the selector GS marks the next group, viz G*h*.

Each group of trunks comprises means for detecting if, in one or several trunks of the group, the framing code CS*y* is not received at the correct time. When this occurs, the group circuit signalizes this fact to the circuit XCV as soon as it is connected to it, without however indicating the identity of the trunk which seems to be out of synchronism.

The framing code detector of the group circuit comprises a comparator DS (FIG. 4) which supplies a signal DS when the code stored in the register 198 is identical to the code CS*y*. When, at time V24, no signal DS appears, the flip-flop F sets to the 1 state, unless the trunk considered is out of order, i.e. that it has been recognized as impossible to synchronize, in which case a signal HS1 blocks the setting of the flip-flop F to the 1 state (condition: $\overline{DS}$ *x* V24 *x* $\overline{HS1}$). It will be noted that this flip-flop is common to the six trunks of the group, so that the signal F indicates that at least one of the trunks of the group is out of synchronism over, without taking into account those which are out of order.

The phase counter PC advances from Q9 to Q0 in *m*4 (condition: Q'9 *x m*4 *x b*, FIG. 6). As indicated on Table II, the phase Q0 is used for the search of a group G*h* in which at least one trunk is out of synchronism. The selector GS advances at each time Q0 *x m*1 and, in particular, controls successively, through a selection circuit SC3, the application to the circuit XCV of the signal F (if it exists) coming from the circuit of the selected trunk group. As soon as, in the course of this scanning a group is found (G*h* for instance) which comprise a desynchronized trunk (J*n* for instance), the condition Q'0 *x* F *x m*6 *x d* sets the phase counter (FIG. 6) to the position Q1 which is used for identifying the first trunk of the group G*h* (as the case may be, the only one) which seems desynchronized. The register JS2, reset to the position J1 in Q'0 *x m*6 *x d*, shows the code corresponding to the trunk J1. This code is transferred in Q1 *x a* to the register JS1 so that the decoder JSD supplies the signal J1 during the times *b*+*c*+*d* of *mn* (see FIG. 5). The counter JS advances by one position at each signal Q1 *x a*, and the trunk J*n* is selected during the times *b*+*c*+*d* of *mn*. The signal G*h* controls (through the selection circuit SC4, FIG. 5) the transfer, towards the circuit 370 (FIG. 8), of the codes contained in the register 198 (FIG. 4); these codes being also written in the group message store 200 (FIG. 4) at the address given by the instruction memory 151.

All the trunks of a group are selected in six frame periods, but it is possible that no desynchronized trunk be detected although a signal F may exist, as this signal could have been elaborated at the reception of a code CS*y* temporarily disturbed. In order to avoid the situation where the trunk selector selects continuously and indefinitely the trunks of the group G*h* and thus blocks the development of the framing program, the signal T8 supplied by the time delay circuit TC (FIG. 7) controls, at the eighth frame period of the phase Q1 the setting to the position Q9 of the phase counter.

(4.32) First check of the codes received in V24 (phase Q2.—The code contained in the register 198 is transferred, at the time Q1 *x* V24 *x* (*b*+*c*), in the register RG1 (FIG. 8) which is reset to zero in Q1 *x a* and is applied to the decoder D*d* which compares it to the framing code written therein permanently. This decoder delivers a signal *do* when the code received is the framing code CS*y*.

If the trunk J*n* is desynchronized, the signal *do* does not appear and the condition Q1 *x* $\overline{do}$ *x* V'24 *x d* sets the flip-flop S2 located in the circuit 348 (FIG. 8) to the 1 state. The signal V'24 (see diagram 7.1) is present at the times *d* and *a*, and controls the setting of the phase counter to the position Q2 (condition: Q'1 *x a x* S2 *x* $\overline{HS}$) provided the trunk J*n* is not out of order (condition: $\overline{HS}$). The signal S2 blocks the selector JS (FIG. 5) which will receive no more advance pulses Q1 *x m*6 so that the trunk J*n* remains selected. The 1 state of the flip-flop S2 is transferred to the flip-flop S3 placed in the circuit 390 (FIG. 9), under the control of the logical condition Q2 *x* V1 *x* S2 *x c*. The flip-flop S3 has been reset to zero in V1 *x b* and the flip-flop S2 is reset to zero in Q2 *x* V'1 *x d*.

The logical condition S3 means that the trunk J*n* of the group G*h* has been found once out of synchronism. The flip-flop S2 which is in the 0 state is then ready for showing the result of the test at the next time V24.

The counter RC (FIG. 9) is of the same type as the counter JS (FIG. 5) and it comprises two registers RC1 and RC2, a decoder DR, a common control circuit RC3 identical to the common control circuit JS4 (FIG. 5) and the electronic gates RC4 and RC5. The two registers have been cleared at the end of the preceding cycle (condition: Q9 *x c*) so that the decoder DR supplies the signal R*o*. For the condition Q2 *x* (*b*+*c*) the code CR*o* corresponding to this signal R*o* is transferred by the gate RC5 and the circuit RC3 to the register RC1 which shows then the code CR1 corresponding to the signal R1.

At the next time V24 associated with the trunk J*n*, the content of the register 198 (FIG. 4) is transferred to the register RG1 (FIG. 8) by the logical condition Q2 *x* A *x* V24 *x* (*b*+*c*). The fact that this time V24 does concern the trunk J*n* comes from the presence of the signal A which appears in *mn*(*b*+*c*). If the code written in the register RG1 is not the code CS*y*, the absence of signal *do* controls the setting of the flip-flop S2 in the 1 state (condition: Q2 *x* A'' *x do x* V24 *x d*). In this case too, the signal A'' means that the signal V'24 does concern the trunk J*n*.

The fact that these flip-flops S2 and S3 are both in the 1 state means that the trunk considered (J*n* of the group G*h*) has been found desynchronized at two successive times V24.

The condition (*Q*2+*Q*8) *x S*2 *x S*3 *x V'*24 *x a*=*H*1 (circuit 400, FIG. 9) which is applied to the AND circuit RC4, controls the transfer of the code CR1 in the register RC2 (FIG. 8) whereas a code CR2 is written in the register RC1 in Q2 *x* (*b*+*c*).

The flip-flop S3 is reset to the 0 state in V1 *x b*. The state of the flip-flop S2 is transferred to the flip-flop S3 (condition: Q2 *x* V1 *x* S2 *x c*) and the flip-flop S2 is reset to 0 in Q2 *x* V'1 *x d*.

The decoder DR delivers the signal R1 thus indicating, owing to the presence of a signal S2, that a code different from the code CS*y* has been received during the phase Q2. During the next frame period, the operation is made again and, if the code received in Q2 *x* A *x* V24 *x* (*b*+*c*) is not the code CS*y*, the counter advances by one step and the decoder delivers the signal R2. During the third frame period of the phase Q2, the decoder advances by one step if the code received is not the code CS*y* and delivers the signal R3. The condition R3 *x* S2 characterizes the fact that the codes received during three successive frame periods of the phase Q2 at the time V24 associated with the trunk J*n* are different from the code CS*y*. A framing operation on the trunk J*n* must be carried out and the phase counter PC advances to the position Q3 for the condition Q'2 *x* R3 *x* S2 *x a*. It will be noted that the signal R3 is available since the time V'24 *x b* and that the signal S2 lasts at least up to V'1 *x d*. The flip-flop S2 is reset to the 0 state in Q3 *x d* and the flip-flop S3 in Q3 *x a*. The counter RC (FIG. 9) will be reset to the position R*o* in Q9 *x c* at the end of the cycle.

On the other hand, after the reception, at the V24 associated with the trunk J*n* of a code different from the code CS*y*, the flip-flops S2 and S3 are respectively in the 0 and in the 1 state after the time Q2 *x* V'1 *x d* (resetting of 0 of S2, FIG. 8). If, at the next time V24 associated with the trunk J*n*, the code received is the code CS*y*, the decoder D*d* (FIG. 8) delivers a signal do so that the flip-flop S2 remains in the 0 state. At the next time V'24 the condition (Q2+Q8) *x* $\overline{S2}$ *x* S3 *x* V'24 *x a*=H2 (circuit 400, FIG. 9) controls the setting to the position R*o* of the counter RC and, at the next time *b*+*c*, the condition Q2 *x* (*b*+*c*) controls the writing of the code CR1 in the register RC1. One is thus ready for starting again a checking cycle, the flip-flops S2 and S3 being reset to the 0 state as previously.

It is thus possible that the counter RC sets many times successively in position R*o* and that it may not reach the position R3. In order to avoid the situation where the circuit XCV remains blocked on a trunk which is out of order, the signal T32, supplied by the time delay circuit TC (FIG. 7), controls the setting of the phase counter to the position Q9 (condition: Q'2 *x* T32 *x m*4 *x b*—FIG. 6) and the flip-flop HS' (circuit 400, FIG. 9) sets to the 1 state for the condition: Q9 *x* T32 *x* A' *x c* (FIG. 9). The flip-flops S2 and S3 are reset to the 0 state (conditions: Q9 *x d*, FIG. 8—and Q9 *x a*, FIG. 9), the registers RG1 and RG2 are cleared (conditions Q9 *x a* and Q9 *x c* respectively, FIG. 8), as well as the counter RC (condition: Q9 *x c*, FIG. 9). The signal HS', which ends in A *x b*, is used to set to the 1 state the flip-flop HS1 (group common circuit GC*h*, circuit 157—FIG. 4), which controls the writing of a 1 in the line of the fault memory 153 associated with the trunk J*n*. During the following readings of this line, the flip-flop HS1 sets in the 1 state and the signal HS1 indicates that the trunk J*n* is out of order. This signal, which lasts up to the time *d*, is extended by the flip-flop HS (FIG. 6) the output signal of which HS lasts for the two basic time slots *d*+*a*.

It may happen that the checking circuit 347 delivers in Q1 signal *do* corresponding to a correctly synchronized trunk, wherein a code CS*y* has been disturbed or to a trunk out of order which has not yet been detected.

The operation processes as above described as long as signals $\overline{do}$ are received. The first signal *do* which appears before the counter RC has reached the position R*o* controls, by a signal H2, the resetting of this counter to the position R*o*, the flip-flops S2 and S3 being in the 0 state since V1 *x c*. If the decoder D*d* (FIG. 8) delivers afterwards three successive signals *do*, the flip-flops S2 and S3 remain in the 0 state and, at each time V'24, a signal $H1=\overline{S2}\ x\ \overline{S3}\ x$ V'24 *x* a (FIG. 9) appears. The third signal H1 sets the counter RC to the position R3, and the condition $\overline{S2}$ *x* R3 indicates that the trunk is correctly synchronized. The phase counter PC (FIG. 6) sets then to the position Q9 (condition: Q2 *x* $\overline{S2}$ *x* R3 *x b*) and the circuits are cleared as previously mentioned.

The phase counter sets to the position Q0 for the condition: Q'9 *x m*4 *x b* and is ready to resume an operation cycle which will start in Q'0 *x d x m*6 as soon as a signal F appears indicating that a trunk is out of synchronism.

(4.33) The framing code search (phase Q3).—As it has been seen hereabove, when a trunk out of synchronism has been detected, the phase counter sets to the position Q3 during which a code CS*y* constituted by six consecutive digits is searched among the signals received on the trunk J*n*. To this effect, the signals received at time *mn*, i.e. in A, are transferred, for the condition Q3 *x* A *x* (*b*+*c*), in the register RG1, where they remain up to the next time A' (condition: Q3 *x* A' *x a*). At time A' *x d* which follows this transfer, the code contained in the register RG1 is transferred in the register RG2. It results therefrom that twelve consecutive digits *x*1 to *x*12 received on the trunk J*n* are available at each frame period. Since these digits are referenced in their order of reception, the register RG2 contains the digits *x*1 to *x*6 and the register RG1 the digits *x*7 to *x*12. They remain written in the registers from the time *mn x c* up to the next time *m*(*n*+1) *x b* and they are applied to the circuit D*d* which delivers a shift signal *dj* (*j*=0 . . . 5) when *j* successive digits of the code CS*y* are contained in the two registers RG1 and RG2. The circuit D*d* is constituted in fact by six identical comparators to which are applied on the one hand the code CS*y* and on the other hand, six consecutive digits among the digits *x*1 to *x*12. Thus, the six digits *x*1 to *x*6 are applied to the comparator delivering the signal *do* and, in a general way, the six digits *x*7–*j* to *x*12–*j* are applied to the comparator supplying the signal *dj*. If a signal *dj* appears, it controls the advance of the phase counter from Q3 to Q4 (condition: Q'3 x A'' *x* Δ *x d*, with $$\Delta = do + d1 + d2 + d3 + d4 + d5)$$

The information contained in the registers RG1 and RG2 remain written.

(4.34) Storage of the value of the shift and reframing (phase Q4).—The phase Q4 is used for recording the amplitude of the shift of the code CS*y* with respect to the writing time of the channels in the phase corrector 111 (FIG. 3) and for performing the reframing operation, the circuits involved being referenced 420 (FIG. 10).

In Q4, *x* A' *x d*, the shift signal *aj* is transmitted to the circuit 430 (FIG. 10) which comprises the coder DC*d* supplying the corresponding code C*j* to the register RC*d* in which it is written. On the other hand, in Q4 *x* A' *x a*, the reframing flip-flop ST (circuit 443, FIG. 10) sets to the 1 state and the signal ST is transmitted to the circuit 161 (FIG. 4) where it controls the writing, in the memory 151 of the code CV2. Since the memory 150 deals at this time with the line associated with the trunk J*n* characterized by the signal A', this code CV2 will control, during the next cycle, the writing of the message contained in the register 198 in the address V2.J*n* of the memory 200.

This phase lasts only one frame period, and one has: *Q*5=*Q'*4 *x A x b*.

(4.35) Shift correction.—The two next phases Q5 and Q6 are used for performing the shift correction in the case where the circuit D*d* (FIG. 8) delivers a signal other than the signal *do*. This correction consists in modifying by one unit, as many times as it is necessary, the write address selection in the phase corrector 111 (FIG. 3)—in order that the six signals of a message be ultimately written on the line assigned to them in the memory 200.

The shift correction is controlled by the signals E0 to E7 delivered by the circuit 441 (FIG. 10). This circuit comprises a counter RE associated with the decoder DE and to the selector DE', these two elements supplying respectively normal signals E0 to E7 (obtained from the codes CE0 to CE7 written in the counter) and delayed singals E'0 to E'7 which are used in the circuit 442 for controlling the advance of the counter.

The codes delivered by the circuits 430 and 441 are applied to the circuit 450 (FIG. 10) comprising the comparator RK which delivers a signal U'2 when said codes are identical and a signal U'1 when they are different. These signals are available on the outputs U2 and U1 respectively during the phases Q5, Q6, Q7 and Q5, Q6.

It will be noted that the signals which control the advance of the counter RE are conditioned by the signal *k*1 at the time of the trunk J*n*, said signal being sent, as well as the signals *k*4 and *k*5 to the circuit XCV by means of the selector SC1 (FIG. 5) which is controlled by the signals G*h* and J*n*.

At the beginning of the phase Q5, the counter RE shows the code CE0 (control carried out in Q9 *x c*) and the decoders DE, DE' deliver the signals E0 and E'0.

The execution of the shift correction will be studied now in the cases *j*=0, *j*=1, 2 or 3 and *j*=4 or 5. It will be well to remember that the circuit DD supplies a signal other than do means that the code CS*y* is written on two lines of the phase corrector 111 of the trunk J*n*. A shift correction is then carried out in such a way that this code is written completely on one line, and that the content of this line is transferred to its correct address of the memory 200·

(4.351) Shift correction for *dj*=*do*.—The comparator supplies then immediately a signal U'2 and a signal *U*2=*Q*5 *x U'*2 is obtained which controls first the writing of the code CE0 in the counter RE (condition: Q5 *x* U2 *x k*5) and second the setting of the phase counter directly in the position Q7 (condition Q'5 *x* U2 *x k*6).

It is easy to notice that the signal *do*, indicating that the code CS*y* coincides exactly with a channel time slot—i.e. that it is written completely on one line of the memory 111 of the trunk J*n*—appears during the transfer to the memory 200 of this code and that the signal ST, which controls the reframing (writing of the code CV2 in the memory 151), appears during the transfer in the memory 200 of the code CV1. At the next cycle, the code CV2 will thus be correctly written at the address corresponding to the received message.

TABLE III

| | Phase Corrector | | | | | | | |
|---|---|---|---|---|---|---|---|---|
| | Address of the stored information | | | | | | | Address selected in the memory 200 |
| | | Column | | | | | | |
| Reading digit time slot *mn* | Line | 1 | 2 | 3 | 4 | 5 | 6 | |
| M1 | 1 | ----- | ----- | ----- | S1 | S2 | S3 | ---------- |
| M2 | 2 | S4 | S5 | S6 | 11 | 12 | 13 | ---------- |
| M3 | 3 | 14 | 15 | 16 | 21 | 22 | 23 | ---------- |
| M4 | 1 | 24 | 25 | 26 | 31 | 32 | 33 | V2.J*n* |
| M5 | 2 | 34 | 35 | 36 | 41 | 42 | 43 | V3.J*n* |
| M6 | 3 | 44 | 45 | 46 | 51 | ----- | 52 | V4.J*n* |
| M7 | 1 | 53 | 54 | 55 | 56 | ----- | 61 | V5.J*n* |
| M8 | 2 | 62 | 63 | 64 | 65 | ----- | 66 | V6.J*n* |
| M9 | 3 | 71 | 72 | 73 | 74 | 75 | 76 | V7.J*n* |
| Writing time without correction | | *k*1 | *k*2 | *k*3 | *k*4 | *k*5 | *k*6 | |
| Time of occurence of the signal *mn* (M1 to M9) | | | XXXX | | | | | |

(4.352) Shift correction for *dj*=*d*1, *d*2 or *d*3.—The presence of such a signal, for instance a signal *d*3, on the corresponding output of the circuit D*d*, means that the two parts of a message are written on two consecutive lines of the phase corrector as it may be seen on Table III. In fact, one has shown, in the table, the information which are written in this memory from the time where it has been recognized that six successive digits S1 to S6 received on the trunk J*n* constituted a code CS*y*. The pulses received further on have been referenced 11, 12 . . . 24, 25 etc.; the first digit of each reference characterizing the channel and the second digit characterizing the order number of the pulse in the channel. The successive digit time slot *mn*, during which the reading of the phase corrector is carried out, have been referenced M1, M2 . . . M9, the digit time slot M1 being that during which is read the line 1 on which is written the pulse S1.

Last, the lower part of the table shows the writing signals *k*1 to *k*6 supplied, by the selector 113, in the absence of shift correction.

The signal *d*3 appears at the basic time slot A *x c* of the digit time slot M2 as well as the signal Δ and the logical condition: Q'3 *x* A'' *x d* controls then the advance of the counter PC which sets in the position Q4 in A'' *x d*.

The operations described hereabove are carried out in Q4 and the phase signal Q5 is elaborated for the condition Q'4 *x* A *x b*, so that this signal is set up in M3.

The condition E'0 *x k*1 *x* Q5 (FIG. 10) sets the counter RE to the position E1 and a shift correction signal SH, which appears in Q5 *x* E1 *x k*4 (circuit 443, FIG. 10), is sent to the column selector 113 of the memory 111 through the circuit SC5 (FIG. 5). It must be noted that the signals *k*1 to *k*6 which are at the trunk J*n* time have no well defined phase relation with the signals *m*1 to *m*6. They are however practically of same duration and one is assured that a signal *k*1 appears between M3 and M4 and at latest in M4, and that the shift correction signal appears three digit time slots later (Q5 *x* E1 *x k*4). It can be ascertained that the correction signal acts over the circuit 113 in M4 and it will be assumed, by way of example, that it interferes afterwards.

In M4 the signals coming from the line 1 are thus written in the memory 200 at the address V2.J*n* and no correction takes place. In order to particularize this example, it will be assumed also that the digit time slot *mn* coincides with the time slot *k*2 on the trunk, or overlaps the time slots *k*2 and *k*3 as it is shown on the last line of Table III and that, when the line 1 is read in M4 *x a*, the signals received on the line 3 (signals which will be read in M6) are just being written. The correction signal SH which appears in *k*4, soon after M4, is applied to the selector 113 while this latter selects the column 4. Under the influence of this signal, the selector 113 jumps from the position *k*4 to the position *k*6, so that the signal 52 (second code pulse of channel 5) is written in the column 6 of the memory 111).

After the setting of the counter RE in position E1, the comparator RK still delivers a signal U'1 so that the next signal *k*1 controls the setting of the counter to the position E2 and a new signal SH appears at the time slot *k*4 (condition: Q5 *x* E2 *x k*4) (FIG. 10). In the meantime, the content of the line 2 of the memory 111 is transferred, in M5, to the memory 200 and the writing in the line 1 (signals which will be read in M7) is carried out as previously, with an advance from the column 5 to the column 6 (see Table III). The operation proceeds in the same way as long as the comparator RK continues to deliver a signal U'1, i.e. as long as the number of jumps from the position *k*4 to the position *k*6 is not equal to the number contained in the register RC*d*. According to the phase relation considered between the signals *k*1 to *k*6 and *m*1 to *m*6, a signal *k*1 which sets the counter RE to the position E3, appears approximately one digit time slot before the signal *m*6 which controls the transfer of the line 3 in the address V4.J*n* of the memory 200. The comparator RK supplies then a signal U'2 which indicates that the counter RE shows the same number as the register RC*d*.

(4.353) Shift correction for *dj*=*d*4 or *d*5

In this case, when the counter RE is in the position E3, the comparator RK delivers a signal U'1 which indicates that it is necessary to transmit one or two additional signals SH.

This additional correction is carried out during the phase Q6 which is elaborated with a delay of a little less than a frame period with respect to the phase Q5 (*Q*6=*Q*'5 *x V*'24 *x U*1 *x d*) for reasons which will be given at the end of this study.

The signal E'3 controls the setting of the counter RE to the position E4 and the corresponding code CE4 is different from the codes CD4 and CD5, so that the circuit 450 delivers another signal U1 and it is seen that this signal cannot control the advance of the counter during the phase Q5.

As it has been seen hereabove, the phase Q6 is set up at the end of the frame period, and the counter RE sets to the position E5 and one has a signal U2 for *dj*=*d*4. For *dj*=*d*5, it sets afterwards to the position E6 and the signal U2 appears at this digit time slot. Each one of these two positions controls the elaboration of a signal SH at the time slot *k*4.

One has seen that the shift correction is carried out by modifying by one unit, one, two or three consecutive times the advance of the selector 113 at the beginning of a frame period, this modification being equivalent to a negative drift.

When the drift between the signals compared by the circuit 130 (FIGS. 3 and 15) is positive, this correction delays the time of error detection and no risk exists of disturbing the operation of the circuits.

When the drift is negative, and that the circuit 130 is about to detect an error—for instance, coincidence between the signals *mn*1*a* and *g*2 *x k*1—the shift correction introduces suddenly an additional negative drift of one, two or three digit time slots and, at the next time of measurement, the signal *mn*1*a* coincides with the signals *k*6 *x g*1, *k*5 *x g*1 or *k*4 *x g*1. One is then in the case where a loss of information will occur as well as a writing error in the instruction store.

The loss cannot be avoided, but the writing error is compensated by elaborating an error signal for the condition:

$$No=g1(k4+k5+k6)\ x\ mn1\ x\ a$$

This occurs also for the coincidence—before a shift correction—between *mn*1 *x a* and:

$$g2\ x\ k1 \text{ for } dj=d2$$

$$g2\ x\ k2 \text{ for } dj=d1$$

On the other hand, the drift between the trunk time and the central exchange time may be very important during the starting of the central exchange and, in order to accelerate the synchronization, an error signal is elaborated for the condition:

$$Po=g2\ x\ (k1+k2+k3)\ x\ mn2\ x\ a$$

(4.36) Second checking of the codes received in V.24

The occurrence of a signal U2 shifts the phase counter from Q5 to Q7 (condition: Q'5 *x* U2 *x k*6). At the beginning of the phase Q7, the shift correction operations are completed by sending a signal (condition E3 *x* Q7 *x k*4) which controls a jump during the writing of the line 2 (these signals will be read in M8) as it appears on Table III.

The phase Q7 is a transistory phase and immediately after the end of the frame period, the phase counter sets to Q8 (condition: Q7 *x* V'24 *x d*).

During the phase Q8, a framing check is carried out once again, identical to that carried out during the phase Q2 and, at the beginning of the operation, the flip-flops S2 and S3 are in the 0 state. It will be noted that all the operations carried out by the circuits RG1, RG2, D*d*, S2 and S3 (FIGS. 8 and 9) and by the counter RC (FIG. 9) during the phase Q2, are also carried out during the phase Q8. If the framing operation carried out from Q2 to Q7 has worked correctly, the signal *do* is received three times, the counter RC sets to the position R3, and the flip-flop S2 is in the 0 state. The condition R3 $x\ \overline{S2}$ means that the code CS*y* is suitable. The phase counter sets then to Q9 (condition: Q'8 *x* R3 *x* $\overline{S2}$ *x* *b*) during which all the framing circuits are reset to the rest position, as well as the flip-flop F which, when in the 1 state, controlled the blocking of the synchronization circuit on the group G*h*. In Q'9 *x* *m*4 *x* *b*, the phase counter sets to the position Q0 in which the selector GS (FIG. 5) advances by one step (condition: Q0 *x* *m*1 which selects the group G*h*+1) and the counter JS is reset to the position where it delivers a signal J1 (condition: Q'0 *x* *d* *x* *m*6). The synchronization circuit is then ready for carrying out a new framing operation.

If the condition R3 *x* S2 is fulfilled, this means that the code found is not the code CS*y*, and one sets to the phase Q3 (condition: Q'8 *x* S2 *x* R3 *x* *b*) and the operations described previously are repeated once again.

In order to avoid the condition where the circuit XCV is blocked on a trunk which is particularly disturbed, the time delay signal T32 controls the direct setting of the phase counter in Q9 (condition: T32 *x* Q'8 *x* *m*4 *x* *b*) and the trunk is set to the out of order position, as it has been explained previously (flip-flop HS' to the 1 state for the condition Q9 *x* T32 *x* A' *x* *c*).

(5) CONTROL SELECTORS OF A PHASE CORRECTOR

TABLE IV

| Line selector | | | Column selector | | | |
|---|---|---|---|---|---|---|
| | Code | | | Code | | |
| Signal | B1 | B2 | Signal | B3 | B4 | B5 |
| | | | *k*1 | 0 | 0 | 0 |
| *g*1 | 0 | 0 | | | | |
| | | | *k*2 | 0 | 0 | 1 |
| | | | *k*3 | 0 | 1 | 1 |
| *g*2 | 0 | 1 | | | | |
| | | | *k*4 | 1 | 1 | 1 |
| | | | *k*5 | 1 | 0 | 1 |
| *g*3 | 1 | 1 | | | | |
| | | | *k*6 | 1 | 0 | 0 |

One will now describe, in relation with the FIGS. 16 to 19, the counters which constitute, associated with decoders, the line selector 112 and the column selector 113 of the phase corrector 111. The codes to which correspond the signals *g*1, *g*2, *g*3 and *k*1 to *k*6 are shown on Table IV hereabove.

Each of the digits of these codes is obtained from a *counting stage* comprising a flip-flop 230 and a control circuit 240 (FIG. 16) to which are applied preparation signals SP and execution signals SV of negative polarity (diagrams 17.2 and 17.3) as well as control signals SC of positive polarity (diagrams 17.4 and 17.5). It will be admitted that the flip-flop is in the 1 state (or in the 0 state) when a voltage +V appears on the output K (or $\overline{K}$), i.e. when the transistor 232 (231) is saturated.

It will be assumed that at the time slot *k*2 of a channel time slot G1 (all these times being at the trunk time HJ), the flip-flop 230 is in the 0 state and that the capacitors 241 and 242 are discharged:

$$(VB'-VA'=0,\ VD'-VC'=0)$$

The base of the transistor 231 is at a potential slightly different from that of the ground and the diode 237 is not conductive whatever may be the potential VA' of the point A'.

At this time *k*2, one has $VA=VB=VE=+V$. The diode 247 is blocked and $VB''=+V$. Therefore, the diodes 245 and 251 as well as the diode 243 do not conduct and the capacitor 241 remains discharged.

In *k*3, $VA=0$, $VB=VE=+V$. The diode 247 is still blocked but a current flows through the elements 249, 251, 241, 243 (the diodes 251 and 243 being conductive) and the condenser 241 is charged at a voltage $$VB'-VA'=+V$$

(see diagram 17.6). Since the charge time constant is chosen so that the condenser 241 reaches the required charge before the end of the time slot *k*3 one has, at the end of this time: $VA'=0$, $VB'=+V$.

On the contrary, if a signal SC1 is not present, in *k*3, the diode 247 is no more blocked, and the capacitor 241 remains discharged.

It is thus seen that the signal SP controls the charge of the capacitor associated to the saturated transistor if a control signal SC1 is simultaneously present.

In *k*4, $VA=VB=+V$, $VE=0$. Since $VA'=0$, the diode 243 is blocked. The diode 247 is conductive and $VB''=0$. The diodes 245 and 251 do not conduct since $VB>VB''$ and the voltage VB' remains equal to +V.

In *k*5 and in *k*6, the control voltages are not modified.

In *k*1 of the time slot G2, one has: $VA=+V$, $$VB=VE=0$$

The diodes 245, 247, 251 conduct and $VB'=0$. The potential of this point becomes thus more negative by V volts as well as that of the point A', the diode 243 remaining blocked.

The capacitor 241 begins then to discharge and a current flows in the direction of the arrow 49 through the base-emitter junction of the transistor 231, the diode 237 which is conducting, the capacitor 241 and the diode 245. The current in the transistor is in the reverse direction and this latter blocks quickly so that the flip-flop 231 sets to the 1 state. The discharge circuit of the condenesr is so designed that the discharge is very quick and the signal K appears almost at the beginning of the time *k*1.

It is thus seen that the signal SV controls the discharge of the capacitor associated to the saturated transistor and the blocking of this transistor.

To sum up, a cycle of signals SP–SV controls the change of state of the flip-flop provided a control signal SC is applied, at the same time as the signal SP, to the condenser associated with the saturated transistor.

It will be noted that the signal SP may be applied permanently since the diode 243 remains blocked in $VA=0$ (capacitor charged).

The resetting to the 0 state is carried out in a similar way under the control of the signals SP, SV and SC0, and it is seen, on the diagrams 17.7 and 17.8, that the signal K disappears a little after the time slot *k*6 of the channel time slot G2.

FIG. 18 represents the general diagram of the line counter which comprises three stages, two of these latter supplying the line code and the third one, the inhibit signal BE used during the drift correction, in the case where $F_C<F_J$. In this counter, each one of the control circuits T1, T2, TE comprises the terminals SP, SV, SC1, SC0 to which are applied the control signals bearing the same references.

It has been previously seen that one of the operations made during the drift correction consisted in ordering an advance of ±1 unit in the line selection of the phase corrector 111, this operation being carried out at the channel time slot (at the time HJ) which follows the elaboration of a signal EA or ER.

In the Table V hereafter, the column 1 represents the line selected

TABLE V

| 1 | 2 | | 3 | | 4 | | 5 | |
|---|---|---|---|---|---|---|---|---|
| | Time slot G1 | | Time slot G2 | | | | | |
| | Former code | | New code | | | | | |
| | | | Normal | | Lead | | Lag | |
| Selected line: | | | | | | | | |
| *g*1 | 00 | | 01 | | 11 | | 00 | |
| *g*2 | 01 | | 11 | | 00 | | 01 | |
| *g*3 | 11 | | 00 | | 01 | | 11 | |
| | B1 | B2 | B1 | B2 | B1 | B2 | B1 | B2 |

at a channel time slot G1 by the decoding of the code represented on column 2 and the columns 3, 4, 5 represent the codes shown by the counter at the next time slot G2 in the case, respectively, of a normal selection, of a lead correction, and of a lag correction. By comparing this table to FIG. 18, the lead conditions summed up in Table VI hereafter may be written. It will be noted that the signals $k3$, $k1$, EA, ER, B1, B2 are signals of positive polarity with respect to ground, so that a signal $\overline{k3}$, for instance, is a negative signal of base +V and of amplitude V volts appearing in $k3$.

As to the signal BE, it is seen that it lasts for the whole channel time slot G2 which follows immediately the signal ER (see diagram 17.8) which appears in particular, during the time $k3$ (see FIG. 3).

TABLE VI

| | Setting from the *0* to the *1* state | Resetting from the *1* to the *0* state |
|---|---|---|
| Flip-flop B1 | $[B2 \, x \, EA \, x \, \overline{ER} + \overline{B2} \, x \, EA] \, x \, B1$ | $B1 \, x \, \overline{ER}$ |
| Flip-flop B2 | $\overline{B2} \, x \, \overline{ER}$ | $B1 \, x \, \overline{EA} \, x \, \overline{ER} + \overline{B1} \, x \, B2 \, x \, EA$ |

The column counter of the selector 113 (represented on FIG. 19) operates in a slightly different way. It uses a cyclic code in which only one digit is modified from one position to the next one, and it is submitted, when a shift correction signal SH is present, to a jump from $k4$ to $k6$. It is seen that, in this counter, the input terminals SP are permanently brought to the potential +V and that the input terminals SV receive the signals which are complementary to the signals Y of positive polarity delivered by the regeneratives repeater 101 (FIG. 3) on its output terminal 12.

Owing to the use of a cyclic code, each flip-flop switches only once per channel time slot. Thus, for instance, the flip-flop B3 sets from the 0 to the 1 state in $k4$ (see Table IV). In order to control this switching, the control signal is applied in $k3$ to the input SP and the execution signal, constituted by a signal $\overline{Y}$ which defines the next digit time slot, sets the flip-flop to the 1 state. For the shift correction, a signal SH which appears in $k4$ (circuit 443, FIG. 10) controls the jump to the position $k6$.

While the principles of the above invention have been described in connection with specific embodiments and particular modifications thereof it is to be clearly understood that this description is made by way of example and not as a limitation of the scope of the invention.

We claim:

1. A pulse code modulation telephone switching system comprising means for transmitting coded signals comprising speech signals in the form of multi-bit series words and synchronization signals, means for converting said multi-bit series binary words into a parallel form, means for transmitting said binary word in said parallel form through the switching stages in said system, time controlled means whereby said transmission of said binary word is carried out during a time base schedule comprising a plurality of pulse periods grouped into time frames, synchronizing means for synchronizing said pulse periods independently of the synchronism of said frames, and means for detecting a defective trunk and means responsive to the detection of a defective trunk for stopping said synchronizing means from attempting to synchronize signals transmitted over said trunk.

2. A pulse code modulation telephone switching system comprising means for transmitting and receiving coded signals over a plurality of multi-channel trunks, said signals comprising speech signals in the form of multi-bit series binary words and synchronization signals, means for converting said multi-bit series binary words into a parallel form, said means for converting said words into parallel form comprising a plurality of conductors, there being one conductor for each bit in each of said binary words, means for constituting groups of trunks, there being as many trunks in a group as there are bits in a binary word, each of said trunks having an incoming line circuit, said circuit comprising a regenerative repeater, phase corrector means comprising a memory having a predetermined number of memory cells divided into a plurality of groups, each of said groups including one memory cell for each bit in one of said binary words, means for storing each of said binary words as it is received in a group of said binary cells, time control means whereby said transmission of said binary word is carried out during a time base schedule comprising a plurality of pulse periods grouped into time frames, means for reading in parallel form the contents of said phase corrector during the digit time slot reserved for the message on the corresponding trunk so that the groups of memory cells are read cyclically during said reserved digit time slot, frequency drift means for detecting the time positions of said digit time slots and indicating the direction in which said time positions have drifted when said drift has exceeded a predetermined value, and means for synchronizing said pulse periods independently of the synchronism of said frames.

3. A pulse code modulation telephone system comprising means for transmitting and receiving coded signals over a plurality of multi-channel trunks, said signals comprising speech signals in the form of multi-bit series binary words and synchronization signals, said trunks arranged in groups, means for converting said multi-bit series binary words into a parallel form, said last named means including a group of incoming line circuits associated with each of said groups of said trunks, trunk group data storage means having a number of addresses, said number being the product of the number of trunks in a group multiplied by the number of channels on each of said trunks, group instruction means comprising an address store having a number of memory positions corresponding to the number of trunks in a group, each of said memory positions being individually associated with a corresponding one of said plurality of trunks, means responsive to the address selected by said group instruction means for cyclically storing said binary words in the memory cells indicated by said selected address, desynchronization detector means for delivering a desynchronization indicating signal when said synchronization signal does not coincide with the selection of the corresponding address, time controlled means whereby said transmission of said binary word is carried out during a time base schedule comprising a plurality of pulse periods grouped into time frames, and synchronizing means for synchronizing said pulse periods independently of the synchronization of said frames.

4. The system of claim 3 and error memory means comprising a line of memory devices individually associated with each of said trunks, means responsive to said desynchronization indicating signal for detecting the direction of drift, and means for storing a corresponding error signal in the line of memory devices corresponding to the trunk carrying said desynchronized signals.

5. The system of claim 4 and means responsive to said error signal for making a lead or lag time correction to restore said synchronism.

6. In a central exchange associated with a PCM data transmission network, pulse and frame synchronization circuits comprising means for constituting groups of six trunks if each channel time slot is divided into six digit time slots, each of said digit time slots being reserved for the parallel exploitation of the messages received, in serial form, on a given trunk, incoming line circuits associated with the incoming line of each trunk, each of said incoming line circuits comprising first a regenerative repeater receiving the incoming message signals and delivering normalized message signals and reference signals at the mean frequency of the incoming message signals, second a phase corrector having a capacity of three messages and being organized as a three by six memory and wherein the write selection is controlled by a line selector and a digit selector receiving the reference signals in such a way that the normalized message signals received in series form are stored cyclically in said phase corrector in parallel form, third, means for reading in parallel form the content of the phase corrector at the digit time slot reserved for the exploitation of the messages received on the considered trunk so that the three lines of said phase corrector are read cyclically at said digit time slot and fourth, a frequency drift detector wherein the time positions of the reference signals and of the digit time slot signals are compared and which delivers control signals as a function of the direction of the drift when said drift exceeds a predetermined value, trunk group circuits associated with each group of trunks, each of said trunk group circuits including first six incoming line circuits, second a group data store comprising 144 lines if each trunk comprises 24 channels, third a group instruction store having six lines, each of said lines being reserved for instructions relative to one trunk and which are cyclically read with the digit time slot signals, said store comprising a group address counter controlling the cyclic address selection in the group data store, an error memory and a fault memory and fourth, a desynchronization detector delivering a desynchronization signal when a frame synchronization code is not received during the time of selection of its address in the group data store, means for storing the control signals on the direction of the drift delivered by the frequency drift detector of a given incoming line circuit on the line of the error memory relative to said trunk, means for correcting the drift error is a given incoming line circuit under the control of the control signals read in the error memory when the address reserved for the storage of the frame code is extracted from the group address counter at a digit time slot reserved to said incoming line circuit, said correction consisting, according to the direction of the drift, first in a lead or a lag correction on the advance of the line selector of the phase corrector and second in a lag or a lead correction on the advance of the address delivered by the group address counter so that all the messages received on the considered trunk, except the frame code, are written without any error or omission in the group data store.

7. In a central exchange according to claim 7, means for controlling cyclically, in a common synchronization circuit, the frame synchronization over all the incoming lines including means for selecting cyclically all the groups of trunks until a desynchronization signal is detected, said signal stopping the selection, means for starting thereafter a cyclic selection of the trunks of said group, means for stopping said trunk selection when the desynchronized trunk is identified and for connecting said trunk to the common synchronization circuit, verifying means for verifying, in said circuit, the frame code by examining three times successively the messages received during the time of selection of the address in the group data store, said verifying means including means for providing a coincidence signal when the messages received are identical to the frame code and a non-coincidence signal when the messages received vary from the frame code, means controlled by the coincidence signal for resuming the cyclic selection of trunks, means controlled by the non-coincidence signal for effecting a frame code search which consists in examining all the received signals until a group of six successive signals is identical to the frame code and for providing when such a group is detected, a signal which characterizes the time position shift of said group of signals with respect to a message address in the phase corrector, means for establishing the frame synchronization comprising first means for modifying the address selection in the group data store so that the address V2 be selected at the time of transfer of the message relative to channel 2 etc. and second means for correcting the time position shift of the group of signals identical to the frame code by successive lead corrections on the digit selector of the phase corrector, means for verifying the frame code thereafter, said means delivering either a coincidence or a non-coincidence signal, said signals controlling respectively the start of the cyclic selection of trunks or a new frame code search.

8. In a central exchange according to claim 6, means for providing a time signal with a repetition period covering 32 frame periods, means for controlling the verification operation with said time signal so that if a coincidence or a non-coincidence signal does not appear after a certain time, said operation is stopped, a defective trunk signal is placed on the corresponding line of the fault memory and the cyclic selection of trunks is resumed.

References Cited

UNITED STATES PATENTS 3,306,978 2/1967 Simmons et al.
3,127,475 3/1964 Coulter.

WILLIAM C. COOPER, Primary Examiner

T. W. BROWN, Assistant Examiner